United States Patent
Caporal Del Barrio et al.

(10) Patent No.: US 12,108,346 B2
(45) Date of Patent: Oct. 1, 2024

(54) HANDLING OF RADIO LINK FAILURES IN TELECOMMUNICATION SYSTEMS

(71) Applicant: NOKIA TECHNOLOGIES OY, Espoo (FI)

(72) Inventors: Samantha Caporal Del Barrio, Aalborg (DK); Simon Svendsen, Aalborg (DK); Benny Vejlgaard, Gistrup (DK); Nuno Manuel Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 33 days.

(21) Appl. No.: 17/595,308

(22) PCT Filed: Dec. 5, 2019

(86) PCT No.: PCT/EP2019/083818
§ 371 (c)(1),
(2) Date: Nov. 12, 2021

(87) PCT Pub. No.: WO2020/228975
PCT Pub. Date: Nov. 19, 2020

(65) Prior Publication Data
US 2022/0232486 A1    Jul. 21, 2022

(30) Foreign Application Priority Data
May 13, 2019   (WO) ................. PCT/EP2019/062147

(51) Int. Cl.
*H04W 52/28*    (2009.01)
*H01Q 1/24*    (2006.01)
(Continued)

(52) U.S. Cl.
CPC .......... *H04W 52/283* (2013.01); *H01Q 1/245* (2013.01); *H04B 1/3838* (2013.01);
(Continued)

(58) Field of Classification Search
CPC ... H04W 52/283; H04W 4/023; H04W 24/04; H04W 52/146; H04W 52/241;
(Continued)

(56) References Cited

U.S. PATENT DOCUMENTS 10,404,308 B1 *  9/2019  Alameh ............... H04B 1/3838
10,993,191 B2 *  4/2021  Hong .................. H04W 52/283
(Continued)

FOREIGN PATENT DOCUMENTS

CN    102763454 A    10/2012
CN    104640187 A    5/2015
(Continued)

OTHER PUBLICATIONS

International Search Report and Written Opinion for International Application No. PCT/EP2019/083818, mailed on Mar. 2, 2020, 15 pages.
(Continued)

*Primary Examiner* — Lana N Le
(74) *Attorney, Agent, or Firm* — Brake Hughes Bellermann LLP

(57) ABSTRACT

When a user equipment detects a condition that a distance between the user equipment, which has an established connection with a network entity of a communications network system, and a subject enters apre-warning region, the user equipment enters a monitoring mode based on at least the detected condition. In the monitoring mode, options of operations to be performed by the user equipment to mitigate degradation of the established connection due to a required power backoff of an antenna of the user equipment are monitored.

15 Claims, 15 Drawing Sheets

(51) Int. Cl.
| | |
|---|---|
| *H04B 1/3827* | (2015.01) |
| *H04B 17/373* | (2015.01) |
| *H04W 4/02* | (2018.01) |
| *H04W 24/04* | (2009.01) |
| *H04W 52/14* | (2009.01) |
| *H04W 52/24* | (2009.01) |
| *H04W 52/36* | (2009.01) |

(52) U.S. Cl.
CPC .......... *H04B 17/373* (2015.01); *H04W 4/023* (2013.01); *H04W 24/04* (2013.01); *H04W 52/146* (2013.01); *H04W 52/241* (2013.01); *H04W 52/367* (2013.01)

(58) Field of Classification Search
CPC . H04W 52/367; H04W 52/24; H04W 52/245; H04W 64/00; H04W 72/21; H04W 52/242; H04W 52/244; H04W 52/246; H04W 52/30; H04W 8/005; H04W 4/029; H04W 4/02; H04W 4/025; H04W 4/021; H04W 88/02; H04W 72/0473; H04W 4/44; H04W 36/0083; H04W 4/026; H04W 36/32; H04W 4/027; H01Q 1/245; H01Q 19/021; H01Q 3/00; H04B 1/3838; H04B 17/373; H04B 17/309; H04B 7/024; H04B 7/0691; H04B 17/318; H04B 1/385; H04B 17/21; H04B 17/27
See application file for complete search history.

(56) References Cited

U.S. PATENT DOCUMENTS

| | | | | |
|---|---|---|---|---|
| 2011/0241854 | A1* | 10/2011 | Matsui | H04W 52/283 340/436 |
| 2014/0071008 | A1* | 3/2014 | Desclos | H01Q 1/245 343/745 |
| 2014/0200003 | A1* | 7/2014 | Kodali | H04W 52/367 455/436 |
| 2014/0357313 | A1* | 12/2014 | Mercer | H04W 52/367 455/552.1 |
| 2014/0370929 | A1* | 12/2014 | Khawand | H04B 1/3838 455/522 |
| 2015/0201387 | A1* | 7/2015 | Khawand | H04W 52/265 455/452.1 |
| 2016/0080060 | A1 | 3/2016 | Yu et al. | |
| 2017/0290011 | A1 | 10/2017 | Kushnir et al. | |
| 2022/0050563 | A1* | 2/2022 | Behzadi | H04W 4/023 |
| 2023/0035010 | A1* | 2/2023 | Kalkunte | H04B 17/373 |
| 2023/0318916 | A1* | 10/2023 | Yu | H04W 8/005 713/155 |
| 2024/0023033 | A1* | 1/2024 | Del Barrio | H04W 52/146 |

FOREIGN PATENT DOCUMENTS

| | | |
|---|---|---|
| CN | 105180852 A | 12/2015 |
| CN | 105359420 A | 2/2016 |
| CN | 107707282 A | 2/2018 |
| EP | 3068185 A1 | 9/2016 |
| WO | 9829968 A2 | 7/1998 |
| WO | 2012176217 A1 | 12/2012 |

OTHER PUBLICATIONS

Office Action for India Application No. 202147057244, mailed on Apr. 1, 2022, 6 pages.

Office Action for European Application No. 19813016.3, mailed on Oct. 12, 2023, 7 pages.

Office Action and Search Report for Chinese Application No. 201980097978.5, mailed on Jun. 28, 2024, 14 pages.

* cited by examiner

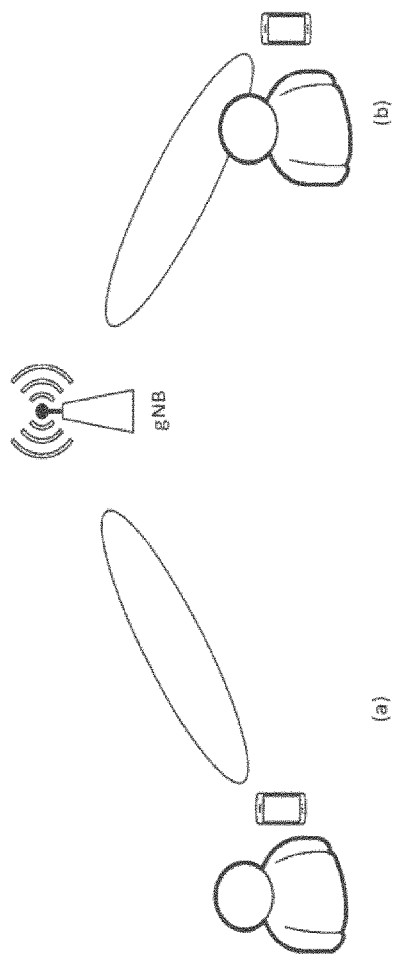
Fig. 1
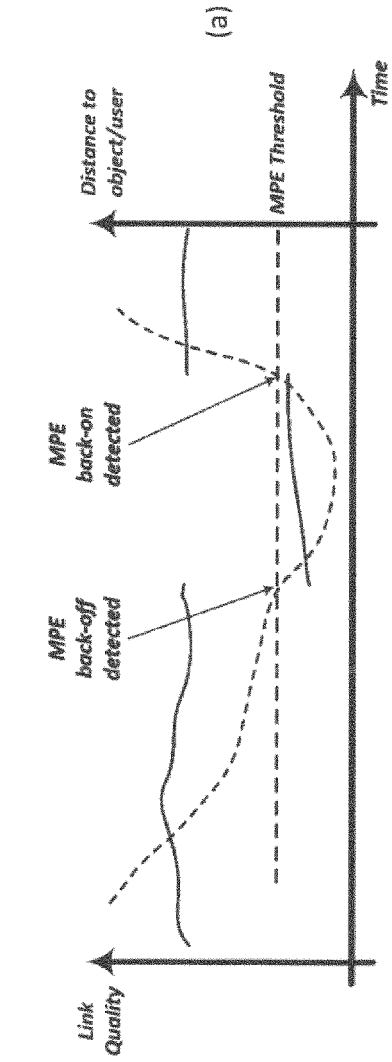
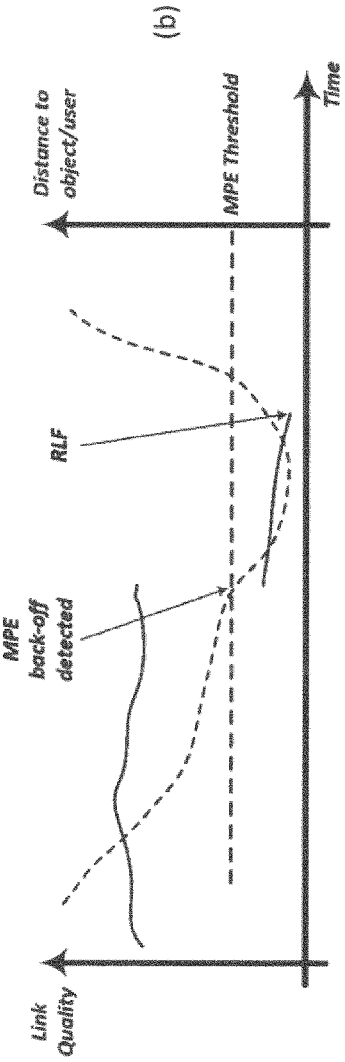
Fig. 2

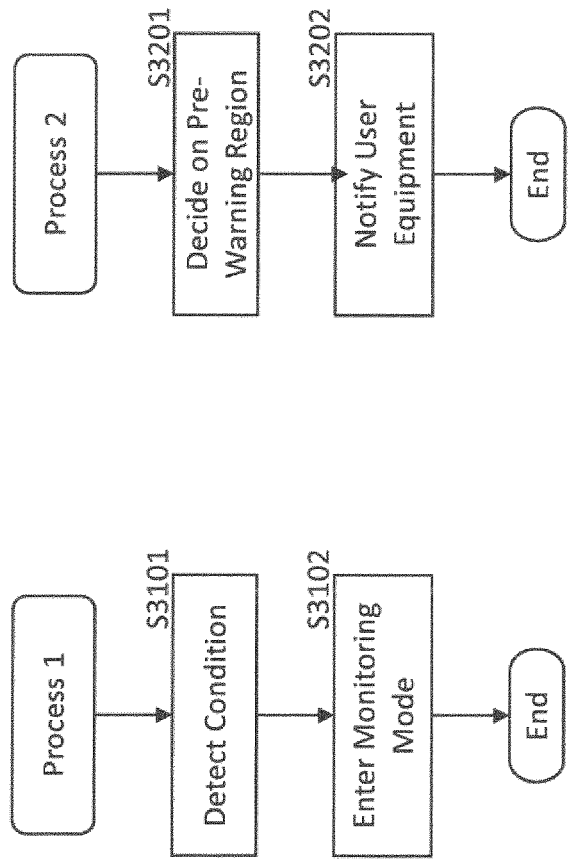
Fig. 3A
Fig. 3B
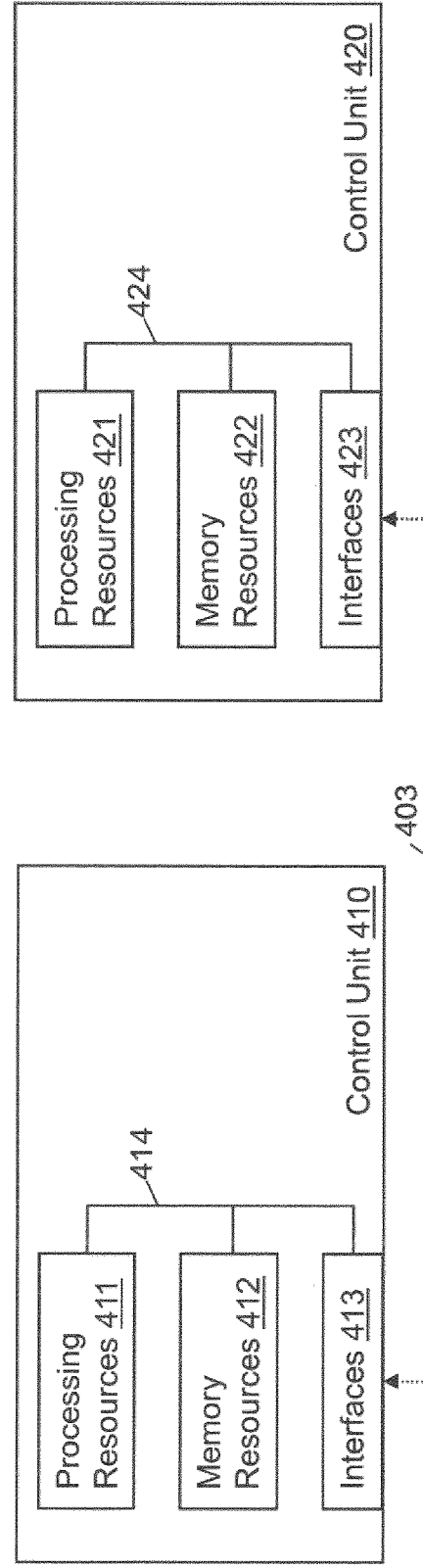
Fig. 4

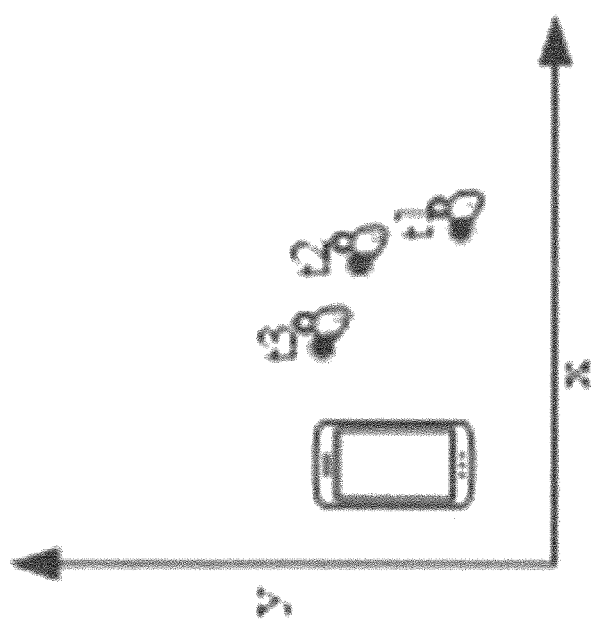

t1 → x1, y1 coordinates of the object relative to the active array t2 → x2, y2 coordinates of the object relative to the active array t3 → x3, y3 coordinates of the object relative to the active array Object detected is too close and directed towards the connected beam => trigger warning and monitoring mode

Fig. 12

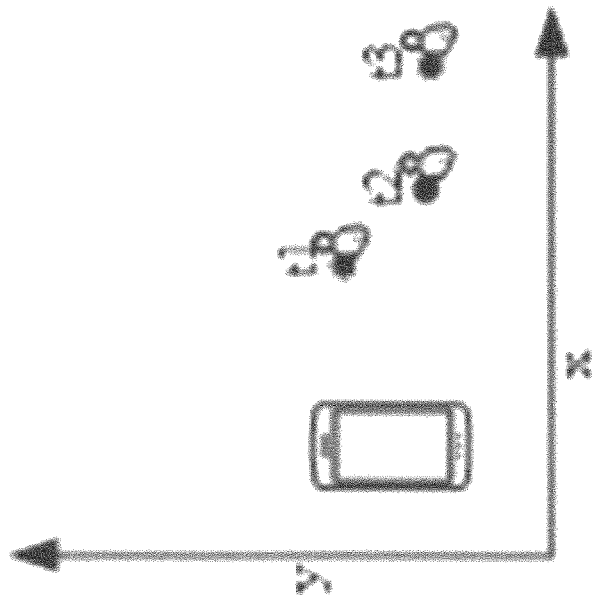

t1 → x1, y1 coordinates of the object relative to the active array t2 → x2, y2 coordinates of the object relative to the active array t3 → x3, y3 coordinates of the object relative to the active array Object detected is moveing away from the connected beam => do not trigger warning and monitoring mode

Fig. 14

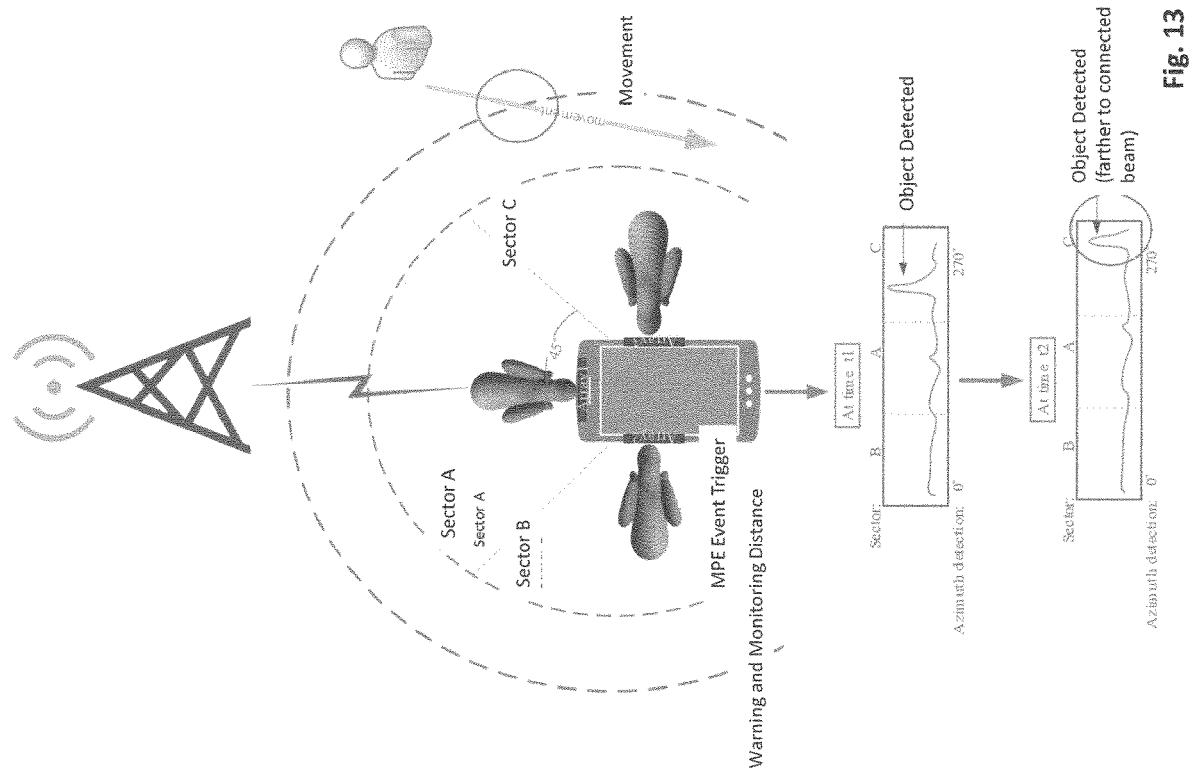

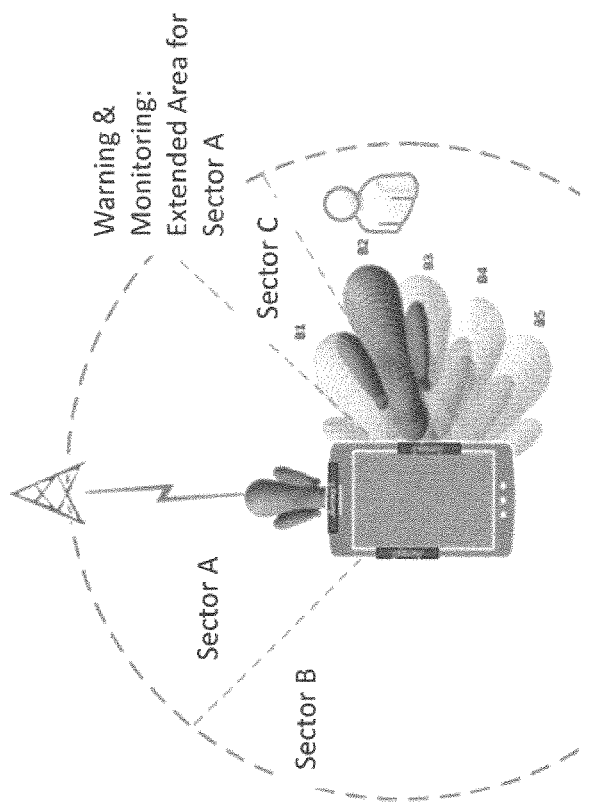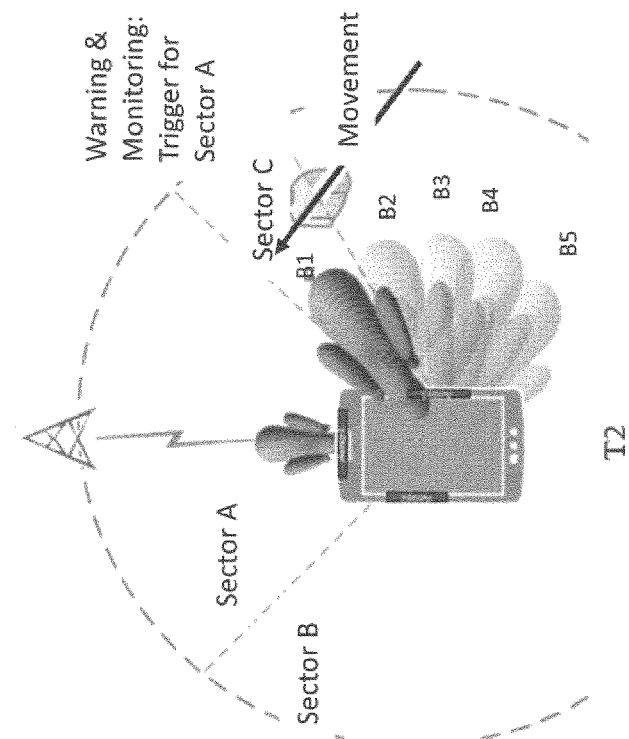
Fig. 19

HANDLING OF RADIO LINK FAILURES IN TELECOMMUNICATION SYSTEMS

CROSS-REFERENCE TO RELATED APPLICATIONS

This application is a national stage entry of International Application No. PCT/EP2019/083818, filed Dec. 5, 2019, entitled "HANDLING OF RADIO LINK FAILURES IN TELECOMMUNICATION SYSTEMS" which claims the benefit of priority of PCT/EP2019/062147, filed May 13, 2019, both of which are hereby incorporated by reference in their entireties.

TECHNICAL FIELD

At least some example embodiments relate to handling of radio link failures in telecommunication systems. For example, at least some example embodiments relate to preventing radio link failures due to maximum permissible exposure power limitations in communications network systems.

LIST OF ABBREVIATIONS 4G 4th Generation
5G 5th Generation
A Antenna effective aperture
ACK/NACK Positive/Negative ACKnowledgement
BS BaseStation
CQI Channel Quality Indicator
DL DownLink
EIRP Effective Isotropic Radiated Power
FCC Federal Communications Commission
FR1 Frequency Range 1
FR2 Frequency Range 2
FR3 Frequency Range 3
FSPL Free Space Path Loss
gNB gNodeB (next generation Node B, Base station in 5G)
ICNIRP International Commission on non-ionizing Radiation Protection
LOS Line Of Sight
mmW millimeter Wave
MPE Maximum Permissible Exposure
MPEC MPE-Compliance
NR New Radio
PBO Power Backoff
PD Power Density
RLF Radio Link Failure
RSRP Reference Signal Received Power
RSRQ Reference Signal Received Quality
SAR Specific Absorption Rate
SINR Signal to Interference plus Noise Ratio
SNR Signal to Noise Ratio
SRS Sounding Reference Signal
TX Transmitter
UCI UL control information
UE User Equipment
UL UpLink

BACKGROUND

As the number of online services dramatically increases every year, the need for bandwidth is huge. The millimeter-wave (mmW) spectrum offers the possibility of using large portions of contiguous bandwidth to address high-throughput applications. The 5th Generation (5G) New Radio (NR) frequency spectrum extends well-above the previous 4th Generation (4G) one, which was ranging from 400 MHz to 6 GHz—otherwise known as Frequency Range 1 (FR1). In mmWave 5G NR, Frequency Range 2 (FR2) comprises the frequencies between 24 GHz and 52 GHz; and extending the NR operation into the 52-114 GHz range is currently being discussed.

Frequencies of 30 GHz and 60 GHz yield a wavelength of 10 mm and 5 mm respectively. Though wavelengths are very short in the mmW spectrum, the received power is not reduced at higher frequencies, if the effective antenna apertures are constant. This can be understood from the following formulas for Free Space Path Loss (FSPL) and Aperture (A):

$$FSPL=(4\pi d/\lambda)^2=(P_t G_t G_r)/P_r \text{ and } A=(G\lambda^2)/4\pi, \text{ where}$$

$P_r$ is the received power,
$P_t$ is the transmitted power,
G is the antenna gain,
$G_t$, $G_r$ are the transmitter and receiver antenna gains,
d is the distance between the transmitter and the receiver,
$\lambda$ is the wavelength.

Consequently, to cover acceptable cell areas and limit the propagation loss, the antenna gain needs to increase with frequency, i.e. the number of antenna elements needs to increase. 5G antennas are expected to provide a gain of around 10 dB at UE and 20 dB at BS.

However, operating at such high frequencies with high gain antennas has raised concerns for the health of the users. Therefore, there is a standard on mmW regime that specifies and regulates the maximum power for the User Equipment (UE). Since frequencies below 100 GHz are non-ionizing, the concern for health is limited to thermal heating of the body tissue while absorbing electromagnetic mmW energy. mmW frequencies yield penetration depths below 1 mm, therefore possible thermal damage is limited to the surface of the skin and the eyes. Most of the energy is absorbed within the first 0.4 mm of the human skin at 42 GHz.

Governmental exposure guidelines are in place to prevent health issues due to thermal effects. Below 6 GHz, Specific Absorption Rate (SAR) has been used to determine the exposure threshold. SAR measures the energy absorbed by the human body when exposed to electromagnetic fields. The SAR limitation in the U.S. is 1.6 W/kg averaged over 1-g tissue from FCC, while in Europe it is 2 W/kg averaged over 10-g tissue. The 1-g averaging provides a finer resolution for the study of energy absorption in the human body.

Nonetheless, at mmW regime where the penetration depth is below 1 mm, even 1-g tissue is in fact a rather large volume. Being difficult to define a meaningful volume for SAR evaluation, it has been commonly accepted to use Power Density (PD) and not SAR to set the restrictions on exposure at mmW frequencies. It is thus a planar energy distribution as opposed to a volumetric one. The Maximum Permissible Exposure (MPE) is the regulation on PD for the mmWave regime. The FCC and ICNIRP set the threshold for MPE at 10 W/m2 (1 mW/cm2), for the general public, between 6 or 10 GHz respectively and 100 GHz. The energy absorbed by the human body increases as a function of the distance to the UE. Therefore, to comply with the MPE limit, the UE might have to reduce its output power if the user gets in close vicinity of the antenna.

UE power backoff to limit exposure will be described next. The UE uplink (UL) takes place in one of the two scenarios (a) and (b) depicted in FIG. 1 illustrating cases (a) and (b):

In case (a), there is an unobstructed (Line of Sight) LOS path from the UE to the gNB.

In case (b), a subject (e.g. a human body, a user) is present on the path of the beam from the UE.

In case (a), the Effective Isotropically Radiated Power (EIRP) peaks at +34 dBm. In case (b), the user is exposed to the radiated beam. As the user comes in close vicinity of the UE, the amount of energy absorbed by the user's body increases; as such the output power of the UE needs to be reduced to comply with the MPE.

For example, for a 2×2 antenna array of the UE, from a distance between the UE (e.g. the antenna/antenna array of the UE) and the user of 14 cm onwards (i.e. distance<=14 cm), the UE needs to reduce its output power to comply with MPE. In this context it is noted that a larger array will require the UE to reduce its power before 14 cm.

Moreover, the peak EIRP drops from 34 dBm to 31 dBm when the user is located at a distance of 10 cm to the UE. It further drops to 8 dBm at 2 mm. Thus, up to a 26 dB drop (for a 2×2 array) can be observed in the transmitted power from the UE in presence of the user nearly touching the antenna.

In summary, some 5G NR bands operate at very high frequencies, thus use high gain antennas to maintain a signal with appropriate signal to noise ratio. However, high gain antennas direct a lot of energy that might come towards the user, whom FCC protects by setting an MPE threshold. The UE must always comply with MPE, and subsequently reduce its output power if the user comes in close vicinity of the UE. The concern is that reducing too much the output power might lead to losing the connection to the base station (gNB), i.e. might result in a Radio Link Failure (RLF).

SUMMARY

At least some example embodiments aim at preventing radio link failures due to maximum permissible exposure power limitations by providing for a warning and monitoring mode.

According to at least some example embodiments, this is achieved by the methods, apparatuses and non-transitory computer-readable storage media as specified by the appended claims.

According to some aspects, there is provided the subject matter of the independent claims. Some further aspects are defined in the dependent claims. The embodiments that do not fall under the scope of the claims are to be interpreted as examples useful for understanding the disclosure.

In the following example embodiments and example implementations will be described with reference to the accompanying drawings.

BRIEF DESCRIPTION OF THE DRAWINGS

FIG. 1 shows a diagram illustrating an uplink scenario.

FIG. 2 shows time charts each illustrating power backoff due to MPE compliance.

FIG. 3A shows a flowchart illustrating a process 1 according to at least some example embodiments.

FIG. 3B shows a flowchart illustrating a process 2 according to at least some example embodiments.

FIG. 4 shows a schematic block diagram illustrating a configuration of control units in which at least some example embodiments are implementable.

FIG. 12 shows a diagram for illustrating an algorithm relating object detection to trigger of the monitoring mode for the case shown in FIG. 11.

FIG. 13 shows a diagram illustrating a case in which a moving direction between the object and the user equipment does not trigger the monitoring mode according to at least some example embodiments.

FIG. 14 shows a diagram for illustrating an algorithm relating object detection to trigger of the monitoring mode for the case shown in FIG. 13.

FIG. 19 shows a diagram illustrating an extended pre-warning region for a connected antenna device.

DESCRIPTION OF THE EMBODIMENTS

Figure 5:
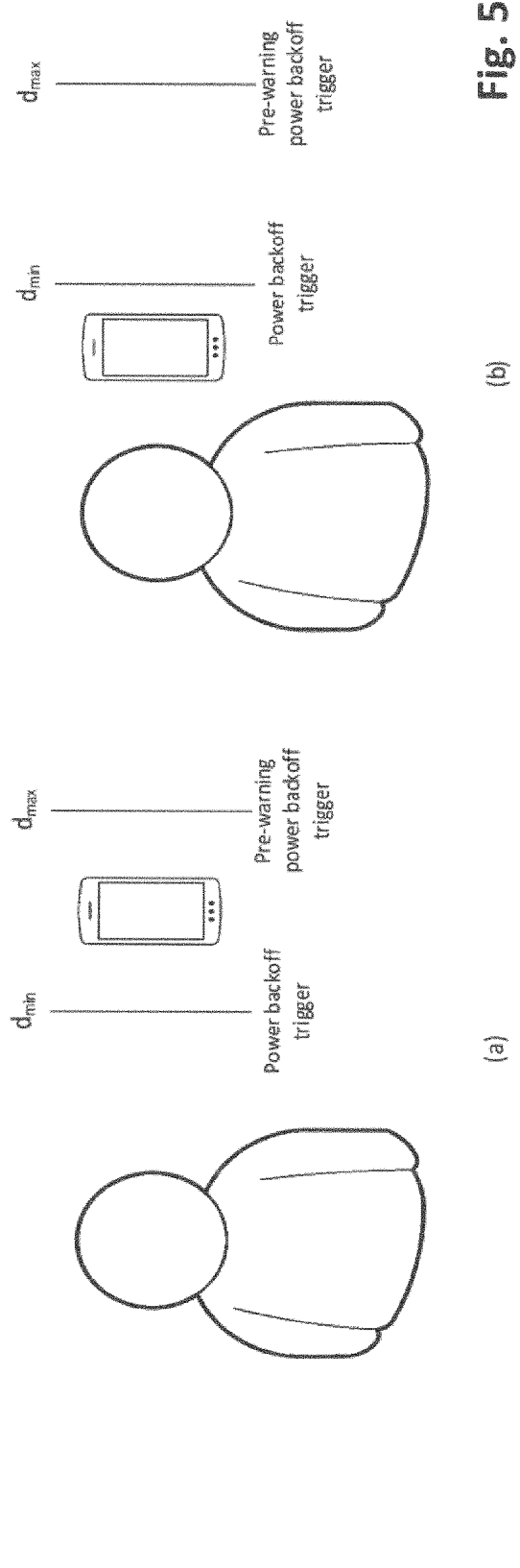
FIG. 5 shows a diagram for illustrating a pre-warning region according to an example embodiment.

As described beforehand, as soon as an MPE compliance mode is triggered (i.e. a UE is detected to be in close proximity of a subject, e.g. a human body, a user), the UE needs to nearly immediately do a Power Back-Off (PBO), as there is no time to check for a better option.

In time charts (a) and (b) of FIG. 2, solid lines indicate a link quality of a connection (e.g. radio link) established between a UE and a network entity of a communications network system (e.g. a gNB) over time, and dotted lines indicate a distance of the UE (e.g. an antenna/antenna array of the UE) to an object/user over time.

In situations (a) and (b) illustrated in FIG. 2, the UE has performed a power backoff due to MPE compliance at a time when the distance to the object/user (also referred to as subject or human body in the following) falls below an MPE threshold. In response thereto, the link quality has dropped.

In situation (a), when the distance exceeds the MPE threshold again, the UE performs an MPE back-on, e.g. increases the output power of its antenna again, and the link quality of the connection established between the UE and the gNB also increases.

However, in situation (b) of FIG. 2, an RLF occurs before the distance exceeds the MPE threshold after the power backoff.

According to FIG. 2, because the PBO can be very large, it is rather likely that an RLF will occur as the gNB is not ready to cope with this extreme drop in the uplink signal.

At least some example embodiments provide for mechanisms that allow the network to cope with PBO due to MPE compliance. Being able to react before the MPE compliance mechanism is triggered has a great impact on the system performance.

According to at least some example embodiments, a sudden drop in UL performance can be avoided.

According to at least some example embodiments, a radio link failure can be limited.

According to at least some example embodiments, DL performance can be maintained.

According to at least some example embodiments, presence of a subject is detected well before the UE must perform a PBO. Dedicated mechanisms built in a device to detect a nearby object including humans, e.g. a proximity sensor, can be implemented in many ways including 60 GHz radars. Based on the proximity sensor, the device will autonomously backoff its TX power to comply with MPE requirements.

FIG. 3A shows a flowchart illustrating a process 1 according to at least some example embodiments. According to an example embodiment, process 1 is executed by a UE.

In step S3101, a condition is detected that a distance between the UE, which has an established connection with a network entity of a communications network system, e.g. a gNB, and a subject, e.g. a user, enters (e.g. falls into) a pre-warning region. The pre-warning region will be described in further detail later on.

In step S3102, a monitoring mode is entered based on at least the detected condition. In the monitoring mode, options of operations to be performed by the UE to mitigate degradation of the established connection due to a required power backoff of an antenna of the UE are monitored. The monitoring mode will be described in further detail later on.

FIG. 3B shows a flowchart illustrating a process 2 according to at least some example embodiments. According to an example embodiment, process 2 is executed by a network entity of a communications network system, e.g. a gNB.

In step S3201, a parameter of a pre-warning region is decided on, wherein, when a distance between a UE and a subject, e.g. a user, enters (e.g. falls into) the pre-warning region, the UE is capable of entering the above-mentioned monitoring mode. The parameter will be described in further detail later on.

In step S3202, the parameter is notified to the user equipment.

As a preliminary matter before exploring details of various example embodiments and implementations, reference is made to FIG. 4 for illustrating a simplified block diagram of various electronic devices that are suitable for use in practicing at least some example embodiments and implementations.

FIG. 4 shows a control unit 410 which comprises processing resources (e.g. processing circuitry) 411, memory resources (e.g. memory circuitry) 412 and interfaces (e.g. interface circuitry) 413, which are coupled via a connection 414. According to an example implementation, the control unit 410 is implemented in a UE.

According to an example implementation, the memory resources 412 store a program that when executed by the processing resources 411 enable the electronic device, e.g. the UE, to operate in accordance with process 1 shown in FIG. 3A.

The interfaces 413 comprise a suitable radio frequency (RF) transceiver (not shown) coupled to one or more antennas (not shown) for bidirectional wireless communications over one or more wireless links 403 with a control unit 420.

The control unit 420 comprises processing resources (e.g. processing circuitry) 421, memory resources (e.g. memory circuitry) 422 and interfaces (e.g. interface circuitry) 423, which are coupled via a connection 424. According to an example implementation, the control unit 420 is implemented in a network entity, e.g. a gNB.

According to an example implementation, the memory resources 422 store a program that when executed by the processing resources 421 enable the electronic device, e.g. the gNB, to operate in accordance with process 2 shown in FIG. 3B.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Further, example embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Further, as used in this application, the term "circuitry" refers to one or more or all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As mentioned above, a pre-warning region is introduced as depicted in FIG. 5, where the UE enters a state where it starts searching for different options on how to mitigate performance degradation due to power backoff.

The pre-warning region is defined between a distance $d_{min}$ (also referred to as second distance) and a distance $d_{max}$ (also referred to as first distance). The distance $d_{min}$ is the distance to the subject, where the UE must change the link because of MPE regulations. The distance $d_{max}$ is the distance to the subject, where the UE starts monitoring.

In situation (a) shown in FIG. 5, the UE is within the pre-warning region where it is at risk of performing a power backoff. In situation (b) shown in FIG. 5, the UE has performed a PBO.

According to at least some example embodiments, the UE informs the gNB that a user is located in close vicinity of the antenna used for uplink. According to an example implementation, the UE also reports to the gNB different options available instead of a PBO. These messages are sent after the detection of the human body but before a PBO is triggered due to the MPE limit. Thus, the gNB has time to evaluate—with the UE—and rank the different options available in order to maintain the connection, in spite of the presence of the user. In the event of reaching the MPE limit, according to an example implementation, the UE has already been instructed by the gNB on what action to take, depending on its capabilities and on the channel.

According to an example implementation, the UE and the gNB may make a co-decision during the pre-warning region, to avoid a large and sudden PBO, potentially causing an RLF. When/If the user comes too close to the antenna and triggers an MPE compliance action (e.g. a PBO), the UE has already agreed with the gNB on the action to take. This could be better than a PBO, however if there was no better option than a PBO and an RLF should happen, both the UE and the gNB are informed on the reason of the lost connection.

According to an example implementation, making the (co-)decision should happen before the distance between the subject on the LOS path and the UE has become so small that the UE backs the power off. According to an example implementation, the reconfiguration of the link from the UE includes knowledge from the gNB. Usually, the UE alone cannot choose the best option without the channel knowledge that the gNB can provide. According to an example implementation, if an RLF occurs, the gNB is informed in advance for best performance.

According to an example embodiment, to handle a PBO due to MPE compliance, a pre-warning region (monitoring zone) is introduced, e.g. as shown in FIG. 5, and human body detection close to the antenna used for uplink is reported to the gNB by the UE well before the MPE limit.

According to an example implementation, options with gNB and UE are evaluated, on what to do if the user approaches and triggers PBO, e.g. using signaling on UE beam capabilities to the gNB.

According to an example implementation, instructions are sent from gNB to the UE on what will be the best option in such event, e.g. using signaling on reported UE beam capabilities to the UE.

Advantages of a warning message sent from the UE to the gNB when a subject entering the pre-warning region is detected by the UE are that the gNB may find a more suited configuration for the UE than the PBO, and the gNB knows why there is a link imbalance.

According to an example implementation, in the pre-warning region the UE monitors different possibilities in case of a user triggering an MPE-compliance (MPEC) based action. In other words, in the pre-warning region the UE is in a monitoring mode in which options of operations to be performed by the UE to mitigate degradation of the established connection due to a required power backoff of an antenna of the UE are monitored.

Note that this monitoring mode is triggered by a user approaching but not yet requiring a PBO and might not even affect the current radio link. Therefore, the current signal is so good that a monitoring mode would normally not be activated. In this specific scenario, the UE forces a monitoring mode based on the risk associated to a sudden RLF because of an MPE-based PBO. Monitoring is happening while the link is in good conditions, in the pre-warning region, to possibly find a better option than a sudden large PBO of e.g. 26 dB. The pre-warning region is defined between distances $d_{min}$ and $d_{max}$ as shown in FIG. 5, where $d_{min}$ is where the UE must change the link because of MPE regulations and $d_{max}$ is where the UE starts monitoring.

For example, an antenna of 1 cm operating at 60 GHz is assumed. The Far Field of such an antenna is situated from 4 cm onwards (FF=$2D^2$/lambda, D is the distance between the user and the antenna). At a given threshold $d_{min}$ (e.g. 14 cm), the UE must proceed with an MPE-compliance action to protect the user. The location of the user is estimated with proximity sensors. Let us assume $d_{max}=d_{min}$+offset, though the exact values for these thresholds are UE specific. The pre-warning region (monitoring zone) is depicted in FIG. 6, between a pre-warning threshold corresponding to $d_{max}$ and an MPE threshold corresponding to $d_{min}$.

Figure 6:
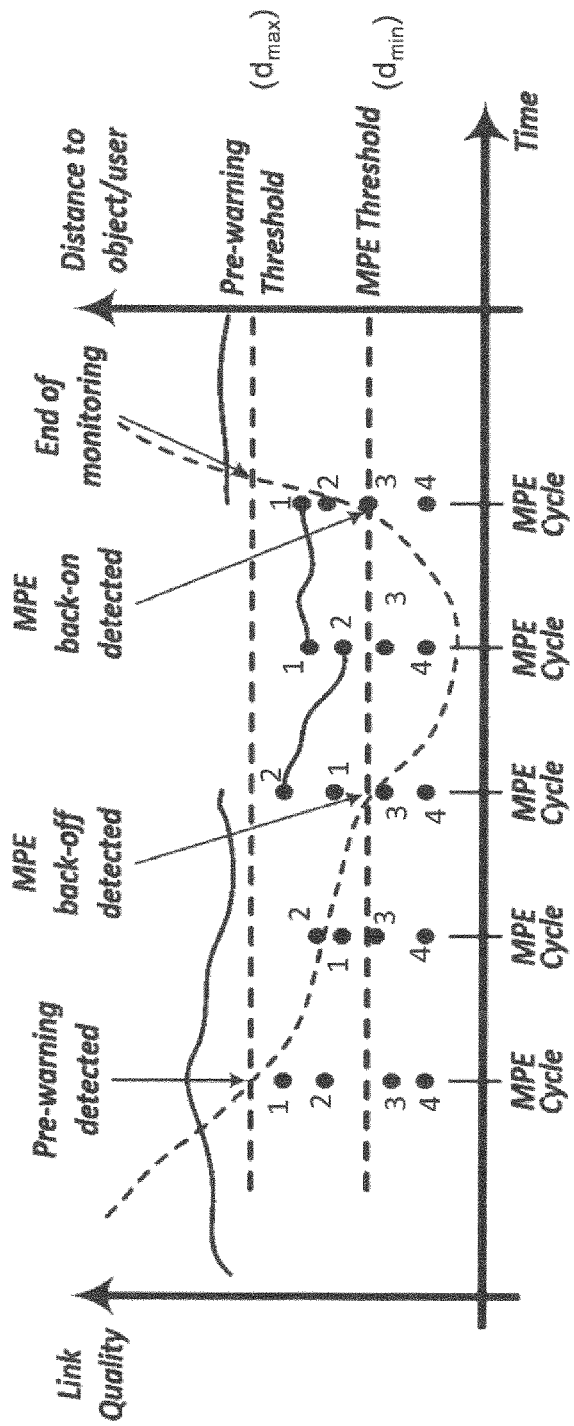
FIG. 6 shows a time chart illustrating a monitoring zone and MPE cycle according to an example implementation.

FIG. 6 shows a time chart, in which solid lines indicate a link quality of a connection (e.g. radio link) established between the UE and a network entity of a communications network system (e.g. a gNB) over time, and a dotted line indicates a distance of the UE (e.g. the antenna of the UE) to the object/user over time.

The UE is responsible for detecting the pre-warning threshold and starting the monitoring mode. According to an example implementation, the UE detects a condition that a distance between the UE and the object/user enters (e.g. falls into) the pre-warning region in case the distance falls below the pre-warning threshold $d_{max}$ (indicated as "Pre-warning detected" in FIG. 6). In other words, the condition comprises that the distance falls below $d_{max}$. According to an example embodiment, the monitoring mode comprises an MPE cycle (also referred to as monitoring cycle) with which at least one of the above-mentioned options of operations are monitored. Such options are shown in FIG. 6 as dots numbered "1", "2", "3" and "4".

According to an example implementation, the distance $d_{max}$-$d_{min}$ should give enough time for the UE to scan its options, report to the gNB and get a decision back. Once the UE reaches $d_{min}$ (indicated as "MPE back-off detected" in FIG. 6), it reconfigures to the best of the options tested in the monitoring zone. According to FIG. 6, these are options #2 and #1. According to an example implementation, the gNB has already ranked the options for the UE, taking the channel into account.

Referring to FIG. 6, when the distance exceeds the MPE threshold again (indicated as "MPE back-on detected" in FIG. 6), the UE performs an MPE back-on, e.g. increases the output power of its antenna again, and the link quality of the connection established between the UE and the gNB also increases. When the distance exceeds the pre-warning threshold (indicated as "End of monitoring" in FIG. 6), the UE ends the monitoring, e.g. returns from the monitoring mode.

Messaging and ranking of the options available at the UE are out of scope of this application. Briefly, the UE can communicate to the gNB which UE beam configuration is used for sending a specific uplink signal. Consequently, the UE and gNB can gather knowledge on UE capabilities and rank the best option to mitigate the link degradation.

Once the UE has detected that the pre-warning threshold has been reached, according to an example embodiment, the UE starts the monitoring directly. The UE may send its current beam configuration to the gNB.

According to another example embodiment, once the UE has detected that the pre-warning threshold has been reached, it informs the gNB that the pre-warning threshold has been reached. The UE may start monitoring by sending its current beam configuration.

According to another example embodiment, once the UE has detected that the pre-warning threshold has been reached, it informs the gNB that the pre-warning threshold has been reached and requests to start the monitoring mode. Alternatively, the gNB can inform in advance of a conditional monitoring mode, via RRC or MAC layer messaging for measurement reporting configuration, that the UE can start monitoring autonomously once the pre-warning threshold is reached.

Figure 7:
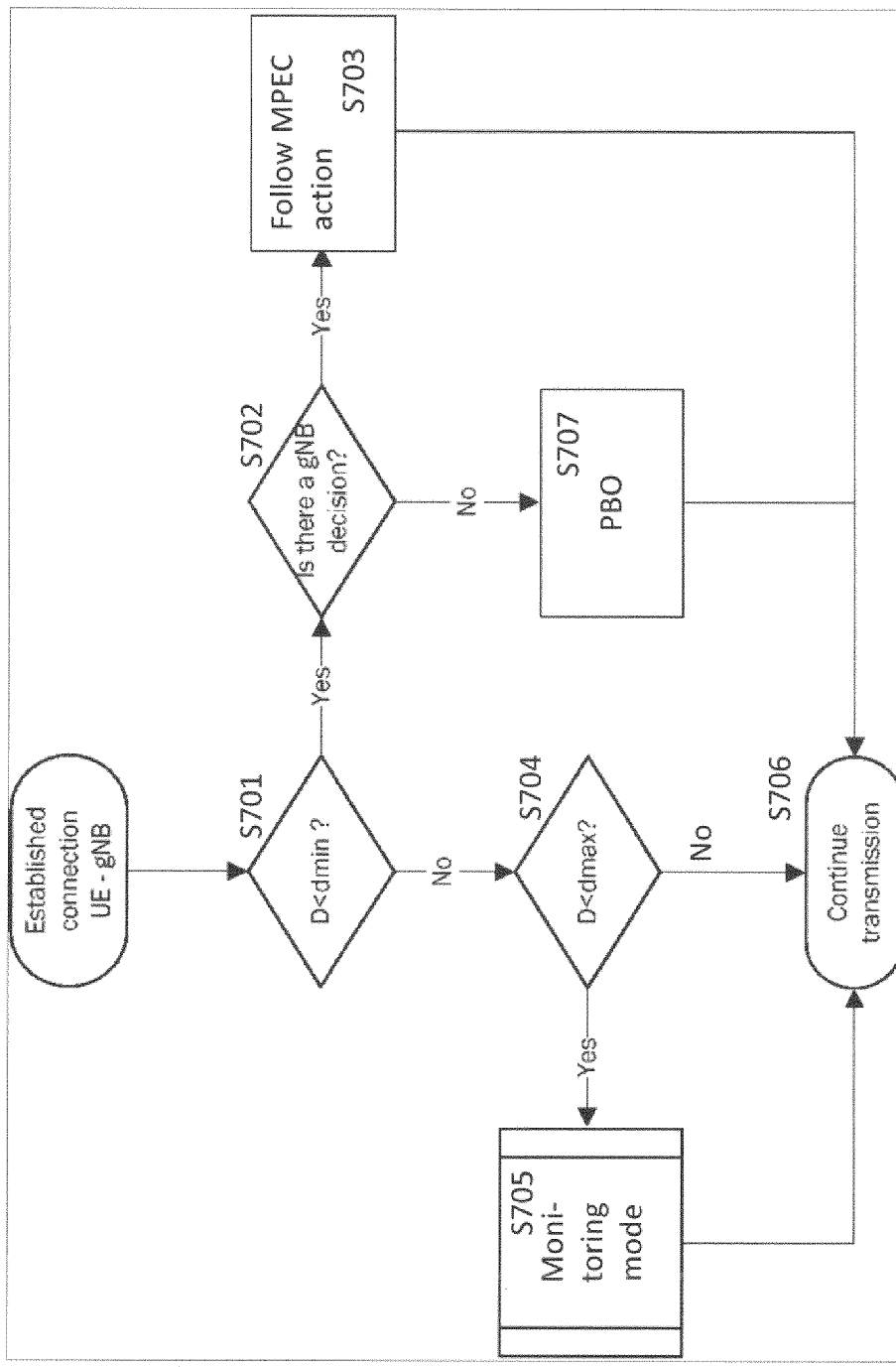
FIG. 7 shows a flowchart illustrating a process according to an example implementation.
Figure 8:
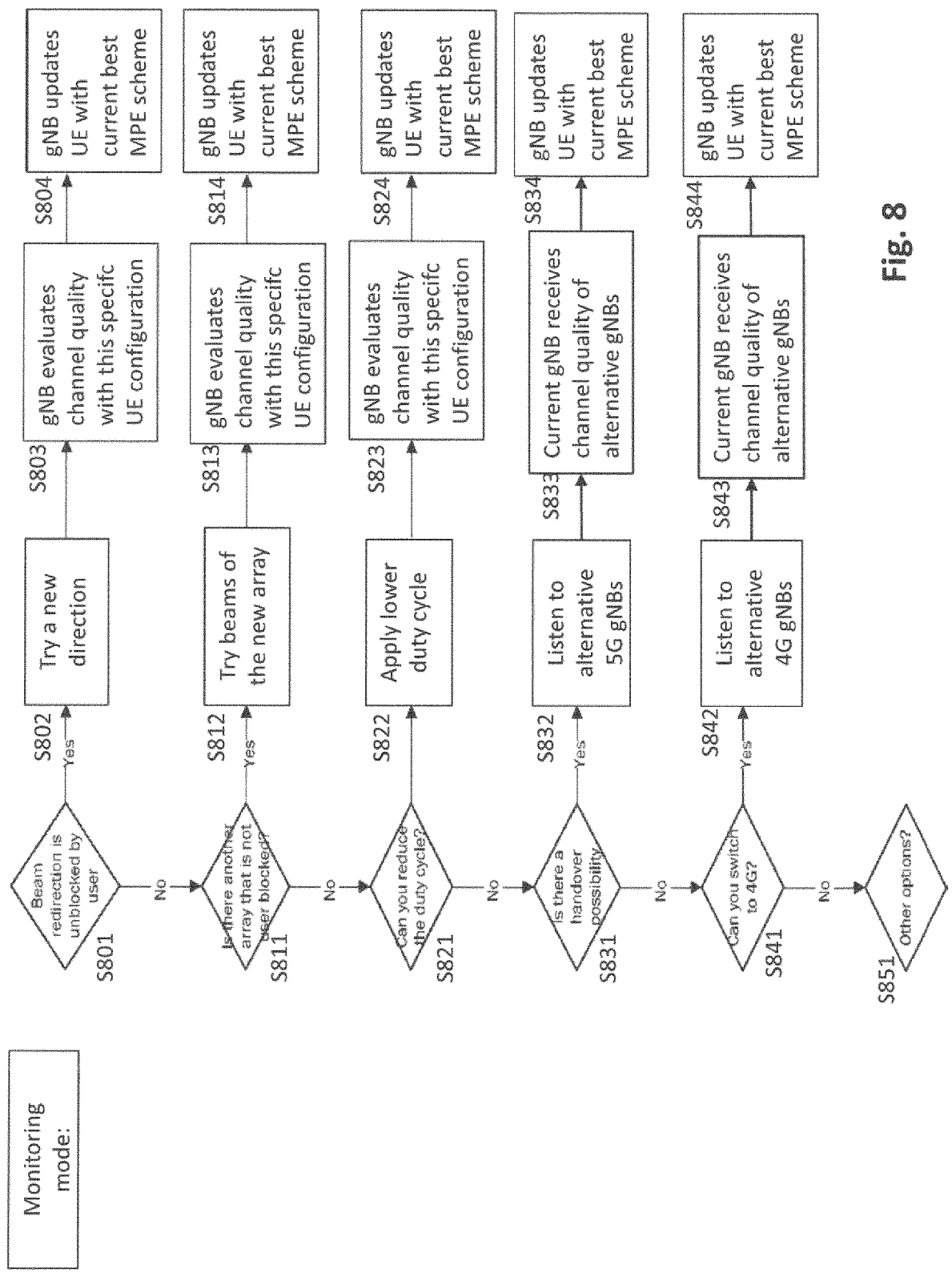
FIG. 8 shows a flowchart illustrating details of a monitoring mode according to an example implementation.

The communication between the UE and the gNB about the different options the UE has to comply with the FCC limit on MPE is summarized in the flow charts of FIGS. 7 and 8.

In FIG. 7, D is the distance between the user and the antennas, while $d_{min}$ and $d_{max}$ are the limits of the pre-warning region where the monitoring occurs (see FIG. 6).

In an established connection between UE and gNB, in case D falls below $d_{min}$ (Yes in step S701), the process of FIG. 7 advances to step S702 in which it is checked if there is a gNB decision on an operation to be performed by the UE to avoid a PBO. If there is no such decision (No in step S702), the process advances to step S707 in which the UE performs a PBO, and afterwards continues transmission in step S706. Otherwise, if there is a gNB decision (Yes in step S702), the process advances to step S703 in which an MPEC action is followed, and then transmission is continued in S706.

In case D does not fall below $d_{min}$ (No in step S701), the process of FIG. 7 advances to step S704 in which it is checked if D falls below $d_{max}$. If D falls below $d_{max}$ (Yes in S704), the process advances to step S705 in which the UE enters the monitoring mode. After that, transmission is continued in S706. If D does not fall below $d_{max}$ (No in S704), the process advances to step S706 in which transmission is continued.

The flowchart of FIG. 8 lists a few options as options monitored in the monitoring mode according to an example implementation. According to an example embodiment, the gNB selects options of operations to be monitored in the monitoring mode and generates a list of the selected options and forwards the list to the UE. According to another example embodiment, the UE selects options of operations to be monitored in the monitoring mode and generates a list of the selected options. According to still another example embodiment, the gNB and the UE select the options and generate the list together.

In step S801, it is checked whether beam redirection is unblocked by the user. If "Yes" in S801, the process proceeds to S802 in which a new direction of the beam is tried, in S803 this alternative UE beam configuration is sent by the UE to the gNB and the gNB evaluates channel quality with this specific UE configuration, and in S804 the best UE beam for the current channel conditions is chosen by the gNB and signaled back to the UE. In other words, the gNB updates the UE with the currently best MPE scheme.

Assuming same beam for UL and DL, with this option 5G NR UL performance might be kept. The beam could be redirected to the same gNB while avoiding the user. There might be a reflection, which would give less deterioration than a 26 dB drop in power. The UL could be directed to another gNB to both maintain 5G NR UL performance and avoid the user. This option depends on the steerability of the antenna array on the UE as well as on the area covered by the user and on its distance to the UE (FF or NF).

If "No" in S801, the process advances to step S811.

In step S811 it is checked if there is another antenna array that is not blocked by the user. If "Yes" in S811, the process proceeds to S812 in which beams of the new array are tried, in S813 the new UE beam configuration is sent by the UE to the gNB, and in S814 the best UE beam chosen by the gNB is sent to the UE from the gNB. If the UE is equipped with more than one 5G antenna array and if the other array is not covered by the user, this option could avoid directing the power towards the user.

If "No" in S811, the process advances to step S821.

In step S821 it is checked if the duty cycle can be reduced. If "Yes" in S821, the process proceeds to S822 in which a lower duty cycle is applied, in S823 the UE signals the duty cycle to the gNB, and in S824 the best UE configuration chosen by the gNB is sent to the UE. Reducing the duty cycle to cope with MPE from 100% to 50% allows to reduce output power.

If "No" in S821, the process advances to step S831.

In step S831 it is checked if there is a handover possibility. If "Yes" in S831, the process proceeds to S832 in which the environment is scanned. In step S833, the current gNB receives channel quality of alternative 5G gNBs. If the current gNB ranks this option as best one in step S834, the gNB updates the UE accordingly and another gNB takes over the communication with this UE, for both UL and DL. Because the UE had to reduce its output power, redirect the beam or switch array (also redirecting the beam) to avoid the user, the communication might just be better with another gNB.

If "No" in S831, the process advances to step S841.

In step S841 it is checked if the UL can be switched to 4G. If "Yes" in S841, the process proceeds to S842 in which capabilities are reported to the gNB. In step S843, the current gNB receives channel quality of alternative 4G gNBs. If the current gNB ranks this option as best one in step S844, the gNB updates the UE accordingly. 4G uses lower frequency bands, gains and modulation schemes and might not be violating the SAR requirements for the same distance from the user to the UE.

According to an example implementation, in steps S804, S814, S824, S834 and S844, the gNB updates the UE with the best option of the options of operations monitored in the monitoring mode, which is to be used to mitigate degradation of the established connection due to a required power backoff.

If "No" in S841, the process advances to step S851.

In step S851 it is checked if there are other options of operations to be performed by the UE to mitigate degradation of the established connection due to a required power backoff of an antenna of the UE.

For example, (e.g. if "Yes" in S851) the UE may remain using the same array but turn some of the antenna elements off. In this case, the gain of the antenna is reduced proportionally to the amount of antenna elements that are turned off. The antenna radiation pattern becomes much broader. This option is a way to perform a PBO.

Another option proposes to combine multiple gNBs, i.e. to use different gNBs for UL and for DL. This might be relevant in connection with previous options, both redirecting the beam and/or using another antenna array.

In the event of the gNB not being able to communicate to the gNB what to do to mitigate the channel degradation after reaching the MPE limit (e.g. if "No" in S851), the UE must perform a PBO.

In this case, the decision is taken by the gNB with the UE information. This option takes into consideration the UE capabilities as well as the channel. The monitoring zone gives time for the gNB to decide what the UE should do based on real conditions of the channel instantly.

As described above, detection of presence of a subject, e.g. a human body, well before the UE must perform a PBO is proposed. A pre-warning region is introduced, where the UE enters a monitoring state and starts searching for different options on how to mitigate performance degradation due to possible future PBO (e.g. switch beam, switch panel, handover, switch to FR1, etc.).

According to at least some example embodiments described above, the UE informs the gNB that a user is located in close vicinity of the antenna used for uplink. It also reports to the gNB, the different options available instead of a PBO (e.g. switch beam, switch panel, handover, switch to FR1, etc.). These messages are sent after the detection of the human body but before an actual PBO is triggered by the MPE limit. Thus, the gNB has time to evaluate and rank—with the UE—the different options available in order to maintain the connection in spite of the presence of the user. When the user crosses the MPE limit, the UE has already been instructed by the gNB on what action to take, depending on its capabilities and on the channel.

In the following, aspects concerned with how to trigger the warning and monitoring mode (which in this specification is referred to also as monitoring mode) will be described.

Figure 9:
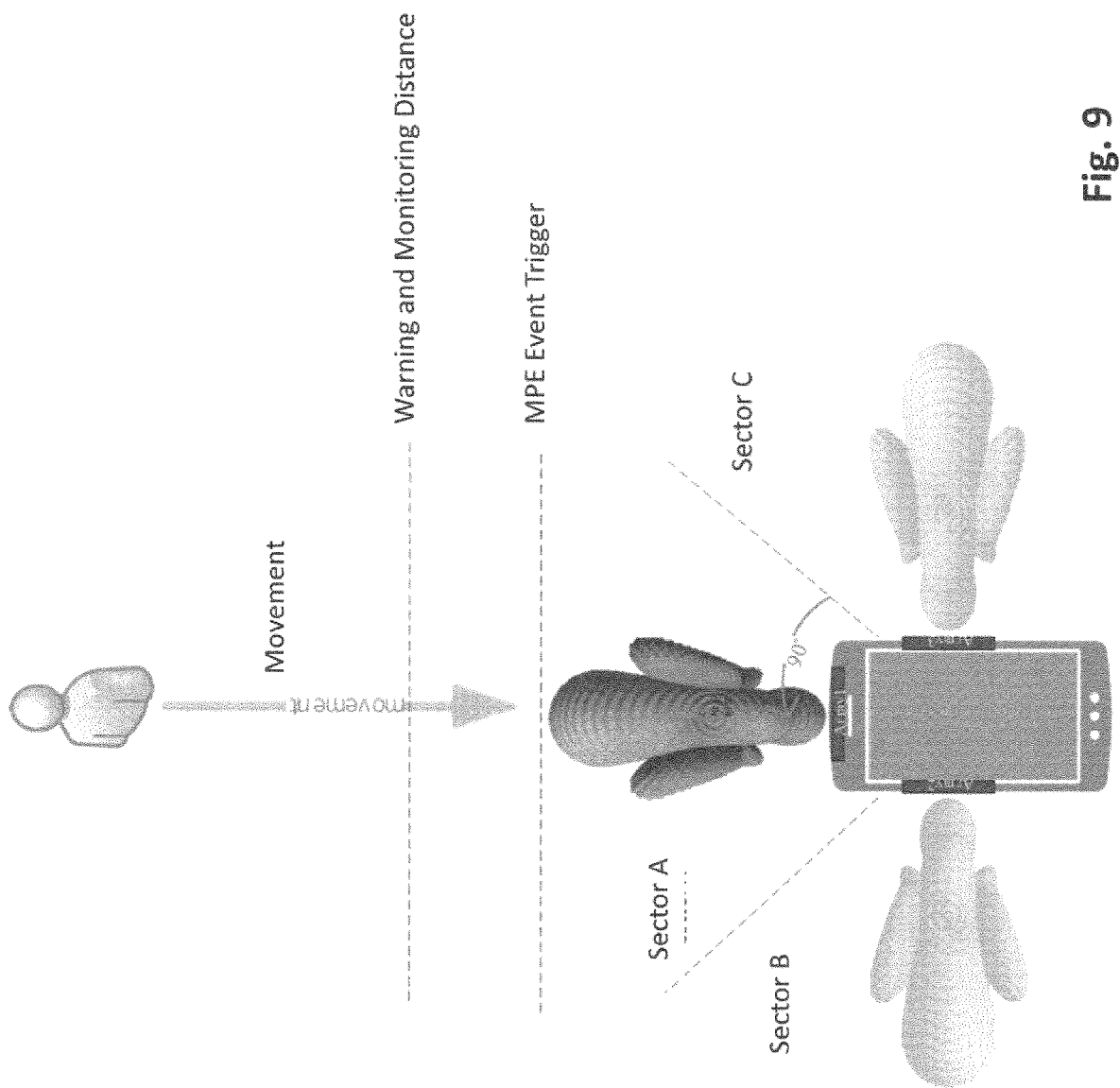
FIG. 9 shows a diagram for illustrating an object approaching an antenna of a user equipment on a path of a communication link.

FIG. 9 illustrates a user (or any human tissue) approaching an antenna of a UE. In this example, the UE has three antenna devices, each covering a 90 degrees sector. It is noted that in this specification the term "antenna device" comprises at least one of an antenna, an antenna array and an antenna panel.

In FIG. 9, an active transmit antenna covers Sector A. Antennas covering Sectors B and C respectively can be controlled independently of each other. Antennas covering Sectors B and C could be inactive. As the user gets closer to for example the active transmit antenna, the warning and monitoring threshold will be triggered (e.g. the condition is detected that the distance between the user equipment and the subject enters the pre-warning region), and the procedures described above will be initiated. These procedures are: trying and ranking different options to maintain the link (e.g. switch panels, switch beam, handover, etc.) instead of a sudden PBO possibly causing an RLF.

The mmW antenna array can be used as a radar to detect nearby objects. However, the radar capability of the array is limited to the sector it covers. Hence, when the antenna covering sector A is active, its radar image can only detect objects in Sector A.

Figure 10:
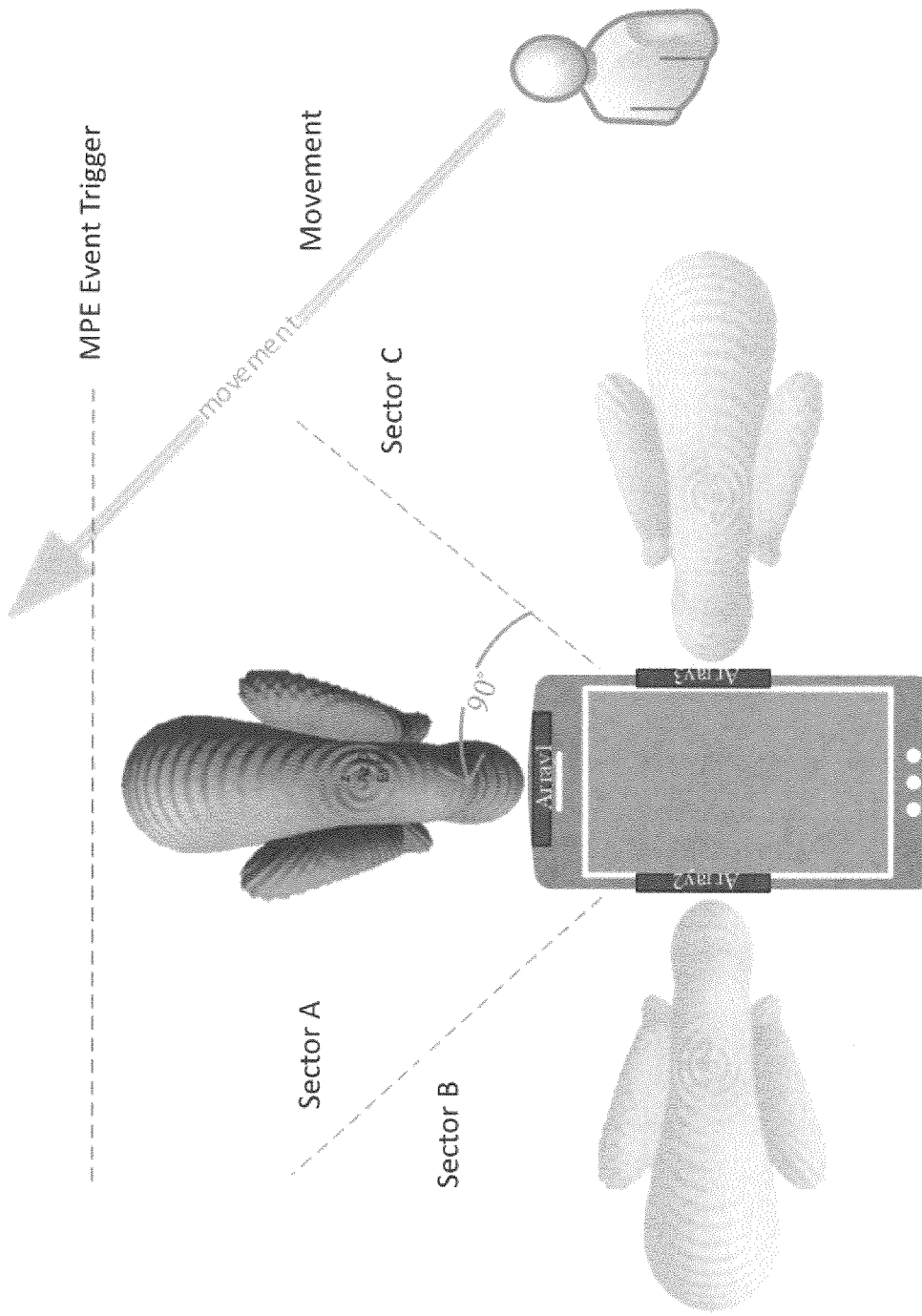
FIG. 10 shows a diagram for illustrating the object approaching the antenna of the user equipment not on the path of the communication link.

Nevertheless, a user could approach the active transmit array without appearing on the radar image provided by that array. Since antennas covering Sectors B and C are inactive, they do not detect the user approaching. In this case, the UE would need to perform a sudden PBO, without having had the chance to trigger the monitoring mode and first evaluate its options in the pre-warning region. This scenario will likely cause a radio link failure and is illustrated in FIG. 10.

The problem is: how to
detect an object (e.g. subject, user) moving towards the UE,
predict that it will cross the path of the active Tx array/beam, and
trigger the monitoring mode, even though this object might be invisible from the radar image of the active Tx array/beam.

At least some example embodiments propose to use a spherical image of surroundings of the UE using the combined (radar) image of all antenna arrays/panels (i.e. active Tx and non-active Tx arrays) to predict the direction of moving objects, thus triggering the monitoring mode (e.g. detecting the condition that the distance between the user equipment and the subject enters the pre-warning region in step S3101 of FIG. 3A).

Figure 11:
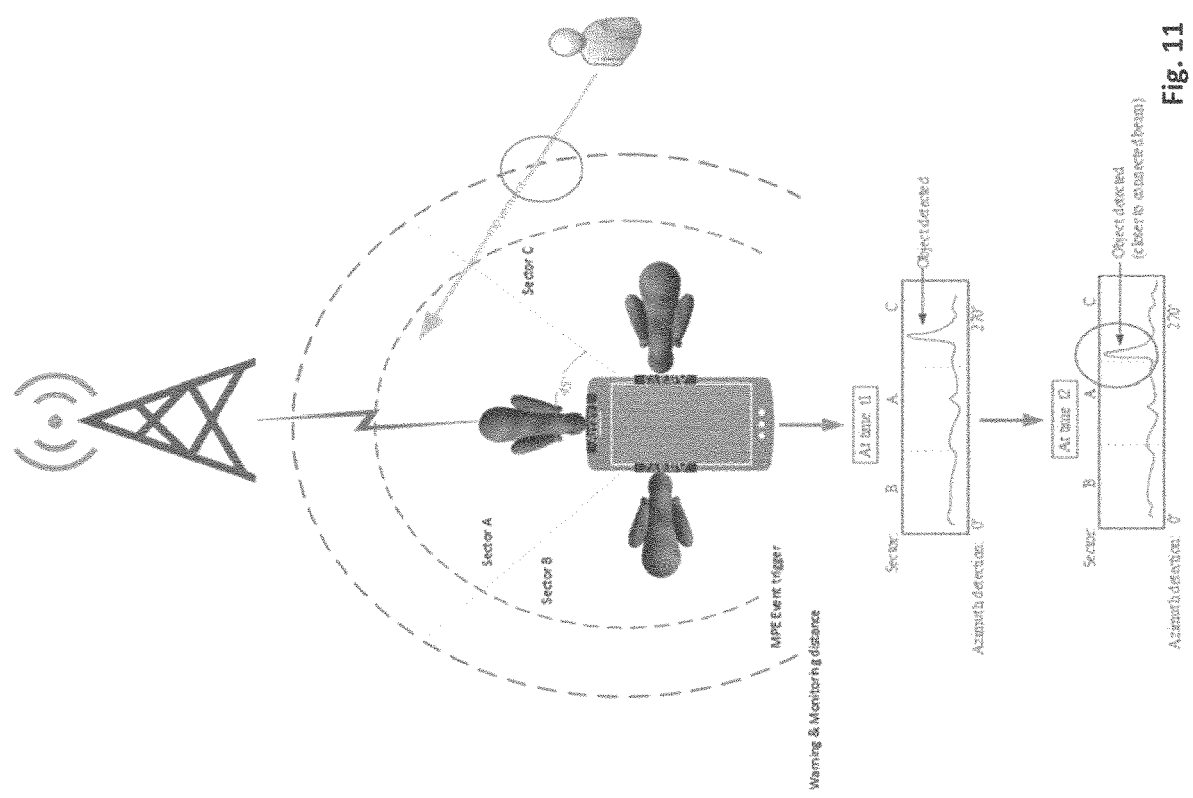
FIG. 11 shows a diagram for illustrating a case in which a moving direction between an object and a user equipment triggers the monitoring mode according to at least some example embodiments.

FIG. 11 shows that even though only one array is used for transmitting to the gNB (active Tx array is antenna device covering Sector A), according to at least some example embodiments, all arrays of the UE are used for creating a spherical image of nearby objects (non-active Tx arrays are antenna devices covering Sectors B and C, respectively). According to an example implementation, it is this image resulting from the combined radar outputs of each array that is used to trigger the monitoring mode (e.g. to detect the condition that the distance between the user equipment and the subject enters the pre-warning region in step S3101 of FIG. 3A). The specific behavior of the gNB and the UE once it enters the monitoring mode has been described above.

According to at least some example embodiments, the user equipment comprises a plurality of antenna devices (e.g. antennas, antenna arrays or antenna panels) for covering sectors around the user equipment. The antenna of the user equipment referred to in step S3102 of FIG. 3A is a connected antenna device, which comprises at least one antenna device of the plurality of antenna devices, and operates the established connection with the network entity (e.g. gNB) referred to in step S3101 of FIG. 3A. In other words, the user equipment is connected to the network entity using at least one connected antenna device, while the antenna devices of the user equipment, which are different from the connected antenna device(s), do not operate the established connection with the network entity. For example, the antenna devices of the user equipment, which are different from the connected antenna device(s), are not connected to the communications network system.

According to at least some example embodiments, in step S3101 of FIG. 3A, at least one non-connected antenna device of the plurality of antenna devices, which is different from the connected antenna device and is capable of detecting the subject, measures a distance between the subject and the at least one non-connected antenna device. Then it is detected whether the measured distance is shorter than the above-described first distance which defines, at least in part, the pre-warning region.

In the example shown in FIG. 11, the connected antenna device is antenna device covering sector A, and the non-connected antenna devices are antenna devices covering sectors B and C, respectively.

As described beforehand with respect to FIG. 5, the pre-warning region is defined between a distance $d_{min}$ (also referred to as second distance) and a distance $d_{max}$ (also referred to as first distance).

In case it is detected that the measured distance is shorter than the first distance, the at least one non-connected antenna device detects a moving direction of the subject. The condition that the distance between the user equipment and the subject has entered the pre-warning region is detected based on the detected moving direction of the subject.

In case the detected moving direction of the subject indicates that the subject is going to enter a sector covered by the connected antenna device and that the subject is going to enter this sector within the first distance, the condition is detected that the distance between the user equipment and the subject has entered the pre-warning region.

According to at least some example embodiments, the at least one non-connected antenna device detects a location of the subject at consecutive instants of time. The moving direction between the at least one non-connected antenna device and the subject is calculated based on the location detected at the consecutive instants of time, and a location of the subject at an upcoming instant of time is assessed based on the calculated moving direction.

When it is assessed that at the upcoming instant of time the location of the subject is going to be present in the sector covered by the connected antenna device, it is detected that the moving direction is directed to the sector covered by the connected antenna device.

According to an example implementation, the at least one non-connected antenna device comprises a plurality of beams for covering a sector of the at least one non-connected antenna device. Then, the location of the subject is detected based on which beam of the plurality of beams is detecting the subject.

According to an example implementation, as mentioned above, a spherical image of surroundings of the user equipment is created by using the plurality of antenna devices, and the location of the subject is detected based on the spherical image.

According to an example implementation, each antenna device of the plurality of antenna devices performs proximity sensing of nearby objects, wherein an image is acquired for each antenna device from the proximity sensing of the antenna device, and the acquired images are combined into the spherical image.

According to at least some example embodiments, also the moving speed of the subject is calculated using at least one of the arrangement of beams or spherical image. Then, by assessing the speed of the movement of the subject, an interval between the consecutive instants of time, e.g. a sampling rate of a scanning radar, is adjusted based on the assessed speed.

As described above, according to at least some example embodiments, a device (e.g. user equipment) with multiple antenna panels, antenna arrays and/or antennas is provided, that have each individually the capability to measure the distance between themselves and objects (subjects) such as a user.

The device is able to keep track of the relative position and orientation between the device and an object (e.g. a subject/user) across the multiple antenna panels, antenna arrays and/or antennas.

According to an example implementation, the device is able to keep track of the relative position and orientation between the device and the object (e.g. user) across the multiple antenna panels, antenna arrays and/or antennas at different and periodic instants in time, i.e. discrete samples of the relative position and orientation are obtained.

According to an example implementation, the device uses the relative position and orientation between the device and the object (e.g. user) to predict if in the upcoming time instants, the object (e.g. user) will cross the power back-off pre-warning or warning distance thresholds of any of the device's antenna panels, antenna arrays and/or antennas.

According to at least some example embodiments, the combined radar image from all arrays (including non-transmitting arrays) of the UE is used to make a decision on a warning trigger of the transmitting array, i.e. whether the subject enters the pre-warning region of the transmitting array or the region of the transmitting array where a PBO is required.

The proposed technique works whether it is the UE that is fixed and the surroundings that change, whether the surroundings are fixed and the UE is moving, or whether they both are changing and moving.

In the following, an example embodiment will be described. FIG. 12 summarizes the steps from combining the radar images of all arrays (Tx active or not) of the UE to the triggering of the warning and monitoring mode at the UE. The UE processes the spherical image of the surroundings with a periodicity t1, t2, t3. Hence, it can track the moving objects and predict whether it will cross the path of the connected beam. FIG. 12 is concerned with a similar situation as shown in FIG. 11, in which the user gets closer to the active array (i.e. active antenna array) which is also referred to as connected antenna device or connected beam.

As shown in FIG. 12, the distance between the active array of the UE and the user is measured at instants of time t1, t2 and t3, and the moving direction estimated from the measured distances reveals that the detected user is too close and directed towards the active array. Hence, the warning and monitoring mode is triggered in the case depicted in FIG. 12.

FIG. 19 illustrates details of the algorithm for triggering the warning for the active antenna (e.g. top antenna covering sector A), in the example of the user being on the side of the UE (thus not detectable by the top antenna but by a side antenna, in the example the antenna covering sector C) as shown in FIG. 11.

Activating and utilizing beams of the side antenna for covering the sector enhances the pre-warning region of the top antenna. For example, the pre-warning region of the top antenna is extended by a region covered by a beam of the side antenna. In the following example illustrated in FIG. 19, the side antenna covering Sector C comprises beams B1 to B5 for detecting objects in Sector C. For example, if an object is detected in beam B1 of the side antenna and only if its moving directions is detected to also moving towards sector A, the warning and monitoring mode will be activated. Hence, in this example, the region covered by beam B1 of the side antenna becomes part of the pre-warning region for the top antenna. The algorithm illustrated in FIG. 19 will avoid activating the warning for the top antenna for every time that beam B1 of the side antenna detects an object. The warning will only be activated if the object has been detected by another beam of the side antenna (e.g. B2, B3, etc.), that it is not detecting the object anymore, thus identifying movement directed towards sector A and coming closer to the UE, within the above-described first distance.

According to an example implementation, according to the arrangement of beams of the side antenna as illustrated in FIG. 19, if B4 detects the object and then B5 detects the object, the object is considered to not have entered the pre-warning region, and the warning and monitoring mode is not activated. On the other hand, if B2 detects the object and then B1 detects the object, the warning and monitoring mode is activated.

According to the example implementation, if the object enters the pre-warning region in sector C and is directed towards sector A, the warning and monitoring mode is activated though the object is still in sector C.

For example, thresholds for warning and monitoring mode activation are applied e.g. with beam number like in the example shown in FIG. 19 or using location estimation. For example, the thresholds are UE specific.

Depending on the implementation (e.g. each beam width), the extended pre-warning region can cover one, two, etc. beams of the side antenna. Similarly, the user may cover only a single beam or multiple beams (e.g. a finger or a head). This flexibility is reflected with 'N–x' in the general algorithm illustrated in FIG. 19.

Moreover, by assessing the speed of the movement of the user, according to at least some example embodiments, the periodicity of the scanning radar is adjusted.

FIG. 13 illustrates the importance of the direction of movement detection to trigger the warning and monitoring mode at the UE. Indeed, if a user approaches the UE but is not going to cross the path of the Tx beam, the warning and monitoring mode should not be triggered. FIG. 14 exemplifies the related algorithm.

As shown in FIG. 14, the distance between the active array of the UE and the user is measured at instants of time t1, t2 and t3, and the moving direction estimated from the measured distances reveals that the detected user is moving away from the active array. Hence, the warning and monitoring mode is not triggered in the case depicted in FIG. 14.

Figure 15:
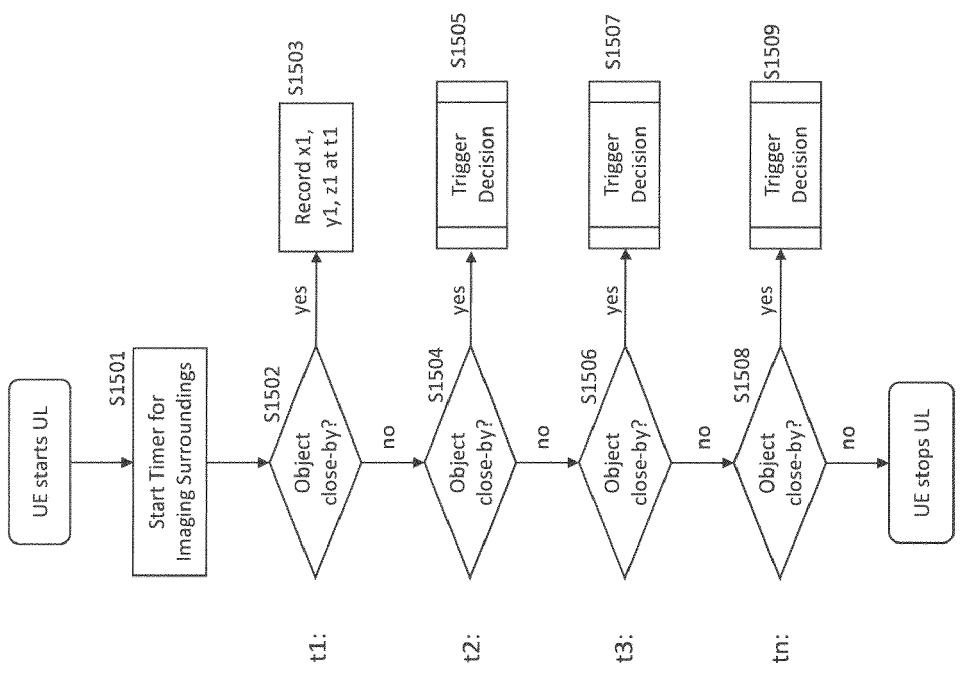
FIG. 15 shows a flowchart illustrating a process of a timer-based decision to trigger the monitoring mode according to at least some example embodiments.
Figure 16:
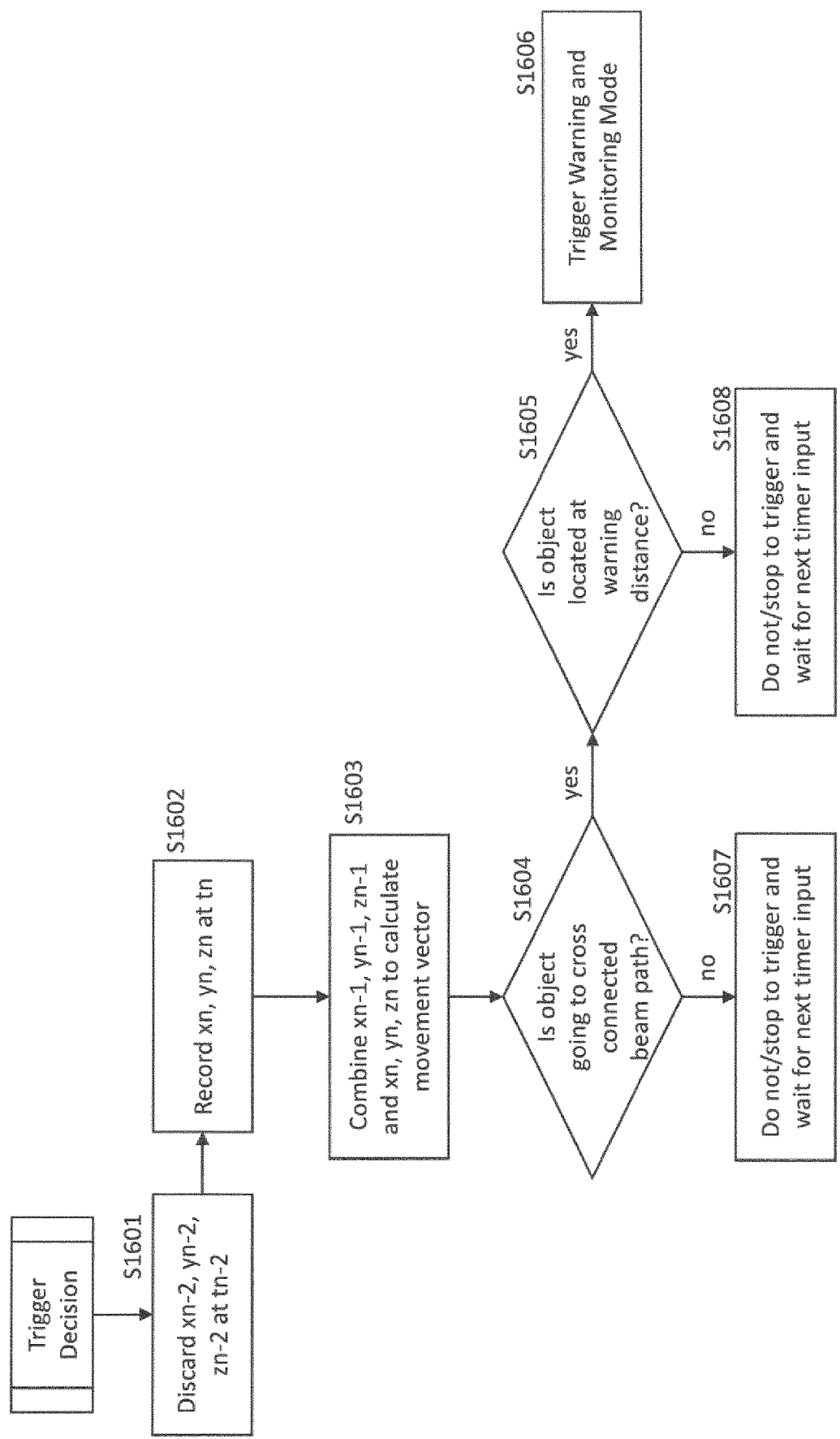
FIG. 16 shows a flowchart illustrating details of the process depicted in FIG. 15.

The algorithm depicted in FIGS. 12 and 14 is summarized in the flowcharts of FIGS. 15 and 16. While FIG. 15 offers the overview on the periodicity (timer) for processing the image of the surroundings of the UE, in FIG. 16 details of the decision for triggering the warning and monitoring mode based on the image of the surroundings are given. FIG. 16 is a sub-process of the flowchart of FIG. 15.

Referring to FIG. 15, according to at least some example embodiments, after the UE has started an uplink communication with the network entity, in S1501, it starts a timer for imaging surroundings. At an instant of time t1, in step S1502, the UE measures whether or not an object is close-by. As described above, for example, for determining whether an object is close-by, the distance between the object and the UE is measured, and if the distance is shorter than the first distance, the object is determined to be close-by. If "yes" in S1502, i.e., in case an object is close-by, the process proceeds to step S1503 in which coordinates x1, y1, z1 of the object relative to the active array used by the UE for the UL are recorded for the instant of time t1. For example, as described above, the coordinates are detected using beams of antenna arrays or a spherical image.

If "no" in S1502, i.e., in case there is no close-by object, the process proceeds to step S1504 representing instant of time t2, at which the UE again measures whether or not an object is close-by. If "yes" in S1504, i.e., in case an object is close-by, the process proceeds to step S1505 in which a trigger decision sub-process is called.

If "no" in S1504, i.e., in case there is no close-by object, the process proceeds to step S1506 representing instant of time t3, at which the UE again measures whether or not an object is close-by. If "yes" in S1506, i.e., in case an object is close-by, the process proceeds to step S1507 in which the trigger decision sub-process is called.

If "no" in S1506, i.e., in case there is no close-by object, the process proceeds to step S1508 representing instant of time tn, at which the UE again measures whether or not an object is close-by. If "yes" in S1508, i.e., in case an object is close-by, the process proceeds to step S1509 in which the trigger decision sub-process is called.

The process shown in FIG. 15 is performed until the UE stops the UL.

FIG. 16 illustrates the trigger decision sub-process. In step S1601, coordinates xn-2, yn-2, zn-2 of the object relative to the active array recorded for instant of time t2-n are discarded. Then, the process advances to step S1602 in which coordinates xn, yn, zn of the object relative to the active array are recorded for the instant of time tn.

Then the process advances to step S1603 in which coordinates xn-1, yn-1, zn-1 of the object relative to the active array which have been recorded for instant of time tn-1 are combined with the coordinates xn, yn, zn in order to calculate a movement vector for estimating a moving direction. Then the process advances to step S1604.

In step S1604 it is decided based on the calculated movement vector, whether or not the object is going to cross the path of the connected beam, e.g. is going to enter a region between the object and the active array. In other words, in step S1604 it is predicted based on the estimated moving direction whether at an upcoming instant of time the distance between the active array (e.g. the connected antenna device) and the object (subject) is becoming shorter than the first distance.

If "yes" in S1604, i.e., in case it is decided that the object is going to cross the path of the connected beam, the process advances to step S1605 in which it is checked whether or not the object is located at a warning distance, e.g. is located in the pre-warning region.

If "yes" in S1605, i.e., in case it is checked that the object is located at a warning distance, the process advances to step S1606 in which the warning and monitoring mode is triggered. In other words, in S1606 the UE enters the monitoring mode.

In the other hand, if "no" in steps S1604 and S1605, the process proceeds to step S1607 or S1608, and the warning and monitoring mode is not triggered or the triggering is stopped, and the next timer input is waited for, i.e., it is waited for the calculated distance at the next instant of time.

According to an example implementation, in the above process illustrated in FIGS. 15 and 16, the periodicity of the surroundings image is 1s or few seconds. Since a user moves in seconds, the timer should also be in seconds, e.g. a processed surroundings image is acquired every second or every few seconds. According to an example implementation, as described above, the timer is adapted to a detected moving speed of the user. The power consumption of the non-transmitting arrays for producing the radar image is very low compared to the UpLink (UL) power of the UL active array. A 1s (or few seconds) periodicity will not have a significant impact on battery life.

Additionally, according to an example implementation, the periodicity is adaptive, and may be determined by the UE manufacturer. It depends on how important the radio link failure is compared to the type of UL application, e.g. talk mode or data transmission mode.

According to an example implementation, the UE obtains the needed 3D view (e.g. image of surroundings) including movement and prediction of movement by using all arrays' radar capability combined.

The prediction of movement works if the sampling rate is higher than movement. Since in 5G Frequency range 2

(FR2) the subcarrier spacing is 120 KHz, the sampling rate is 2 ns which is much higher than the user moves, i.e. in seconds.

Figure 17:
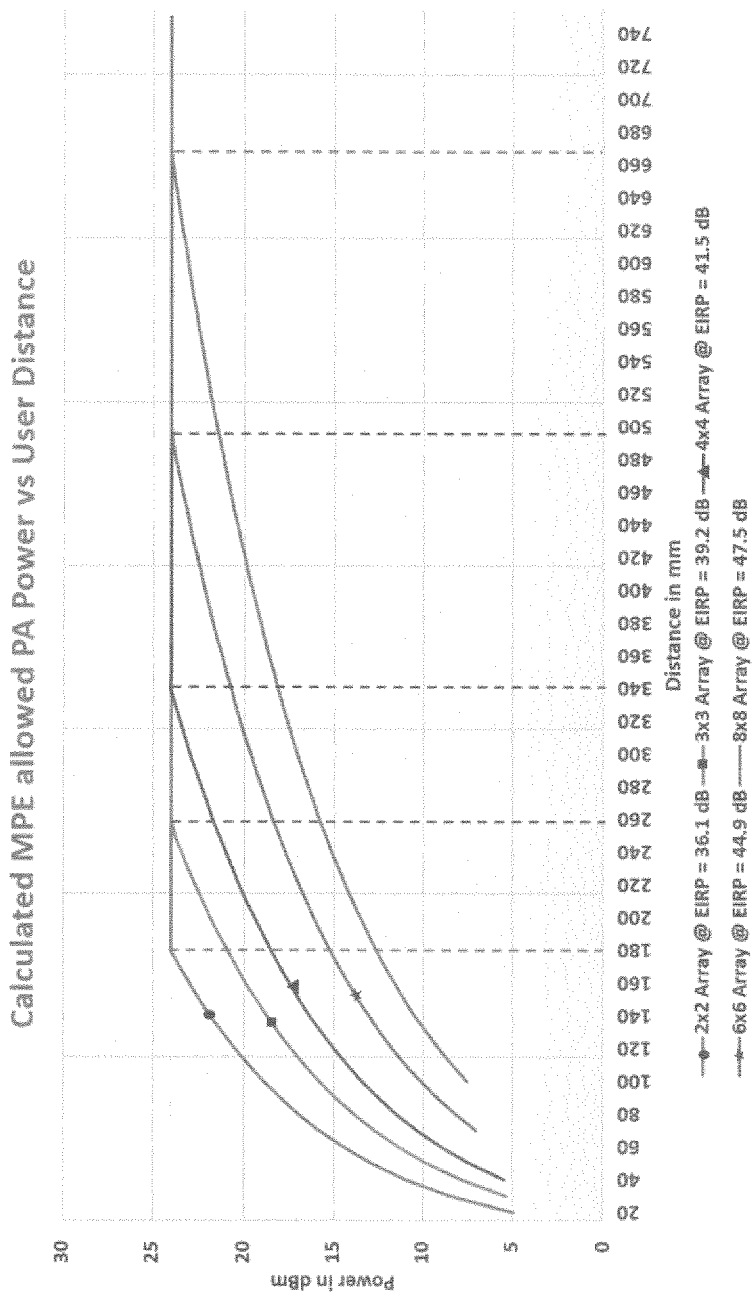
FIG. 17 shows a graphic chart illustrating calculated MPE allowed PA power versus user distance.

It is worth noting that as the frequency of operation increases, if the antenna aperture is kept the same, then the number of antenna elements increases, thus the gain and the EIRP increase as well. As a result, the distance requiring a power back-off moves further away from the transmitting antenna (provided with the same power level at the PA). This phenomenon is illustrated in FIG. 17, where the back-off distance increases from about 18 cm with a 2×2 antenna array to about 68 cm with an 8×8 antenna array.

This numerical example highlights how powerful movement prediction to trigger the warning and monitoring mode can be. It will prevent very frequent and recurrent PBO, RLF and initial access procedures In the following a UE decision mechanism according to at least some example embodiments will be described.

As described above e.g. with respect to FIG. 8, the UE builds a list of alternative links (where some options may require coordination by gNB, and some options may be evaluated autonomously by the UE experiencing the MPE event) and ranks the options for optimum power. This UE based decision mechanism is illustrated in FIG. 18, which also depicts how FIGS. 15 and 16 are related to FIGS. 7 and 8.

Figure 18:
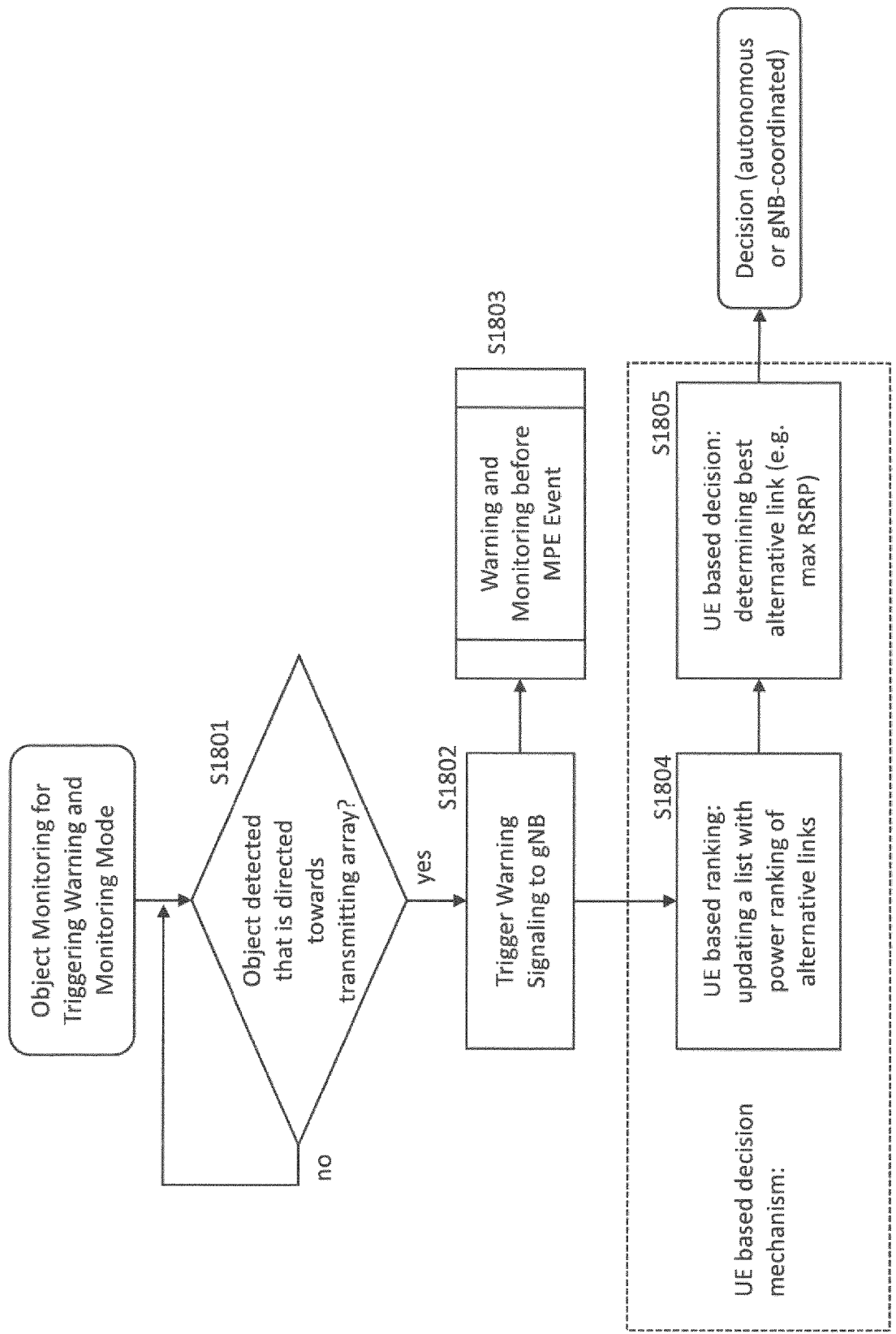
FIG. 18 shows a flowchart illustrating a process of a user equipment based decision mechanism according to at least some example embodiments.

FIG. 18 shows a flowchart that illustrates a process of object monitoring for triggering the warning and monitoring mode according to at least some example embodiments.

In step S1801, it is checked whether or not an object has been detected that is directed towards the transmitting array of the UE, e.g. using the process illustrated in FIGS. 15 and 16.

If "yes" in S1801, i.e. in case an object is detected that is directed towards the transmitting array, the process advances to step S1802 in which a warning signaling towards the gNB is triggered, and then to step S1803, which is a sub-process of warning and monitoring before the MPE event, as illustrated e.g. in FIG. 8.

If "no" in S1801, the process returns to (i.e. remains at) S1801.

From step S1802, the process also advances to step S1804 of the UE based decision mechanism, in which the UE generates a list of alternative links ranked with respect to their power and updates the list. According to an example implementation, the list includes gNB configured links.

From step S1804, the process proceeds to step S1805 in which the UE determines the best alternative link e.g. based on maximum RSRP. According to an example implementation, this best link determination includes gNB feedback for evaluation.

The decision (autonomous or gNB coordinated) output from step S1805 depends on the evaluated links, where transition to the max power link may be transparent to the network. For example, another array of the UE is used for the connection between UE and gNB, with similar gain and remaining on the same CSI. Alternatively, the alternative link has to be coordinated with the gNB, e.g. a different path is used which results in a significant channel change, handover, etc. If no better link is found and MPE evaluation time runs out, the UE will execute PBO.

The trigger for MPE warning in step S1802 initiates ranking of options from UE side in S1804 and decision of a preferred option in S1805. The decision process of when to switch to an alternative link is UE centric and is also covered.

For the ranking in S1804, the goal is to maximize power. After triggering MPE warning in S1802, the UE directly sends a report for a preferred option to the gNB. If not reconfigured by gNB accordingly, it sends the next preferred option, etc.

For the decision in S1805 of when to switch the link, the UE deducts current UL PBO (20-30 dB depending on UE power class) to current DL power measurement to trigger decision to switch the link.

According to an example implementation, in S1804, the UE estimates maximum PBO (e.g. when user is touching antenna) depending on its power class (e.g. max EIRP).

Based on the maximum PBO and prioritization of transmission, the UE decides if DC reduction/PBO is acceptable or if the UE needs to switch the link.

The UE predicts covered and uncovered panels using the movement detection algorithm described above with respect to FIGS. 15 and 16.

According to at least some example embodiment, the monitoring of options of operations in the monitoring mode as described above e.g. in connection with FIG. 3A comprises determining whether at least one of the plurality of antenna devices is a covered antenna device or an uncovered antenna device.

For example, in case the detected moving direction of the subject indicates that the subject is going to enter a sector covered by the connected antenna device and that the subject is going to enter this sector within the first distance, it is determined that the at least one antenna device which detect the moving direction is, at least in part, an uncovered antenna device.

For example, in case the detected moving direction of the subject indicates that the subject is going to stay in a sector covered by the at least one non-connected antenna device and that the subject is going to stay in this sector within the first distance, it is determined that the at least one antenna device is, at least in part, a covered antenna device.

In step S1804, UE based ranking is performed. For example, the UE updates a list with quality ranking of alternative links. For example, the quality comprises at least one of received power, SNR and SINR.

According to an example implementation, channel link parameters are periodically estimated with the plurality of antenna devices, and the plurality of antenna devices are ranked based on the estimated channel link parameters. For example, the channel link parameters comprise at least one of RSRQ, CQI, RSRP, SNR and SINR.

According to an example implementation, the network entity is informed by the UE on whether a monitored link has been monitored using a covered antenna device or an uncovered antenna device.

According to an example implementation, if a new link is needed as in most cases for PC3 and PC4 UEs, the UE prioritizes (future) uncovered panels and ranks all alternative links by received power, e.g. current CSI beam (from another panel, i.e. different gain), additional reflections (only up to 5 dB extra loss in FR2), other CSI-RS (all options it is configured for), handovers, other frequency bands (if data rate/latency/etc. allows it), etc.

According to an example implementation, if the UE is configured by the gNB for a specific measurement (e.g. additional CSI-RS) it also adds this one to the list of options and ranks it by received power.

According to an example implementation, the preferred option is the one exhibiting the highest received power.

According to an example implementation, if switching is transparent to the network, the UE stores and updates power measurement (e.g. same CSI, different panel) during the warning and monitoring mode.

According to an example implementation, if the network has to be involved, the preferred option is signaled back to the gNB during the warning and monitoring mode. Using a reflection might affect timing advance, coding, etc. or handover. Then, the gNB configures the UE for the conditional switch (on the decision in step S1805), the configuration the UE will need to switch to e.g. new CSI or new propagation path.

According to an example implementation, the monitoring of options continues autonomously during the whole MPE event and recovery.

In S1805, according to an example implementation, the UE performs switching when: current DL−currentPBO=<preferred link. That is, according to an example implementation, the UE decides switching the connection in case measured downlink power at the connected antenna device minus a required amount of the power backoff of the connected antenna device is equal to or lower than a predetermined threshold.

It is noted that whether the PBO is static or dynamic just affects when to make the decision but not the ranking of options.

It is further noted that some UE decision may be transparent to the network, but some may require a special gNB action (e.g. other propagation path or handover). Hence, according to at least some example embodiments, the network further configures the UE for additional measurements (e.g. additional CSI-RSRP measurements) and can override of the UE's preferred decision (e.g. handover not possible because of e.g. cell overload). Nonetheless, the final PBO decision at the UE is taken by the UE.

According to an example embodiment, a user equipment is provided, the user equipment comprising:
  means for detecting a condition that a distance between the user equipment, which has an established connection with a network entity of a communications network system, and a subject enters a pre-warning region; and
  means for entering a monitoring mode based on at least the detected condition, wherein in the monitoring mode options of operations to be performed by the user equipment to mitigate degradation of the established connection due to a required power backoff of an antenna of the user equipment are monitored.

According to an example implementation, the user equipment further comprises means for notifying the network entity of the detected condition.

According to an example implementation, the user equipment further comprises means for requesting permission from the network entity to enter the monitoring mode.

According to an example implementation, the user equipment further comprises means for receiving permission to enter the monitoring mode from the network entity, wherein the user equipment enters the monitoring mode based on the detected condition and the permission from the network entity.

According to an example implementation, the monitoring mode comprises a monitoring cycle with which at least one of the options of operations are monitored.

According to an example implementation, the user equipment further comprises means for receiving information on the monitoring cycle from the network entity.

According to an example implementation, in the pre-warning region the user equipment is at risk of performing the power backoff.

According to an example implementation, the pre-warning region is defined by a first distance between the user equipment and the subject and a second distance between the user equipment and the subject, wherein the second distance is shorter than the first distance.

According to an example implementation, when the distance between the user equipment and the network entity falls below the second distance, the user equipment triggers the power backoff.

According to an example implementation, the user equipment further comprises means for receiving an indication of the first distance from the network entity.

According to an example implementation, the options of operations to be monitored in the monitoring mode comprise at least one of options selected by the user equipment and options selected by the network entity.

According to an example implementation, the user equipment further comprises means for receiving an update from the network entity with one of the options of operations monitored in the monitoring mode, which is to be used to mitigate degradation of the established connection due to a required power backoff.

According to an example implementation, the user equipment comprises a plurality of antenna devices for covering sectors around the user equipment, the antenna of the user equipment is a connected antenna device, which comprises at least one antenna device of the plurality of antenna devices, and operates the established connection with the network entity, and the user equipment further comprises means for measuring, by at least one non-connected antenna device of the plurality of antenna devices, which is different from the connected antenna device and is capable of detecting the subject, a distance between the subject and the at least one non-connected antenna device, means for detecting whether the measured distance is shorter than a first distance, wherein the first distance defines, at least in part, the pre-warning region, means for, in case it is detected that the measured distance is shorter than the first distance, detecting, by the at least one non-connected antenna device, a moving direction of the subject, and means for detecting the condition that the distance between the user equipment and the subject has entered the pre-warning region based on the detected moving direction of the subject.

According to an example implementation, the user equipment comprises means for, in case the detected moving direction of the subject indicates that the subject is going to enter a sector covered by the connected antenna device and that the subject is going to enter this sector within the first distance, detecting the condition that the distance between the user equipment and the subject has entered the pre-warning region.

According to an example implementation, the monitoring of options of operations in the monitoring mode comprises determining whether at least one of the plurality of antenna devices is a covered antenna device or an uncovered antenna device.

According to an example implementation, the user equipment comprises means for, in case the detected moving direction of the subject indicates that the subject is going to enter a sector covered by the connected antenna device and that the subject is going to enter this sector within the first distance, determining that the at least one antenna device is, at least in part, an uncovered antenna device.

According to an example implementation, the user equipment comprises means for, in case the detected moving direction of the subject indicates that the subject is going to stay in a sector covered by the at least one non-connected antenna device and that the subject is going to stay in this sector within the first distance, determining that the at least one antenna device is, at least in part, a covered antenna device.

According to an example implementation, the user equipment comprises means for detecting, by the at least one non-connected antenna device, a location of the subject at consecutive instants of time, means for calculating the moving direction between the at least one non-connected antenna device and the subject based on the location detected at the consecutive instants of time, means for assessing a location of the subject at an upcoming instant of time based on the calculated moving direction, wherein, when it is assessed that at the upcoming instant of time the location of the subject is going to be present in the sector covered by the connected antenna device, detecting that the moving direction is directed to the sector covered by the connected antenna device.

According to an example implementation, the at least one non-connected antenna device comprises a plurality of beams for covering a sector of the at least one non-connected antenna device, wherein the user equipment comprises means for detecting the location of the subject based on which beam of the plurality of beams is detecting the subject.

According to an example implementation, the user equipment comprises means for creating a spherical image of surroundings of the user equipment by using the plurality of antenna devices, and means for detecting the location of the subject based on the spherical image.

According to an example implementation, each antenna device of the plurality of antenna devices performs proximity sensing of nearby objects, wherein an image is acquired for each antenna device from the proximity sensing of the antenna device, and the acquired images are combined into the spherical image.

According to an example implementation, the user equipment comprises means for transmitting information to the network entity, wherein the information is about at least one of the monitored options of operations.

According to an example implementation, the user equipment comprises means for informing the network entity on whether a monitored link as an option of the monitored options of operations has been monitored using a covered antenna device or an uncovered antenna device.

According to an example implementation, the user equipment comprises means for periodically estimating channel link parameters with the plurality of antenna devices, and means for ranking the plurality of antenna devices based on the estimated channel link parameters.

According to an example implementation, the user equipment comprises means for deciding switching the connection in case measured downlink power at the connected antenna device minus a required amount of the power backoff of the connected antenna device is equal to or lower than a predetermined threshold.

According to an example embodiment, a network entity of a communications network system is provided, the network entity comprising:
means for deciding on a parameter of a pre-warning region, wherein, when a distance between a user equipment and a subject enters the pre-warning region, the user equipment is capable of entering a monitoring mode in which options of operations to be performed by the user equipment to mitigate degradation of an established connection between the user equipment and the network entity due to a required power backoff of an antenna of the user equipment are monitored; and
means for notifying the parameter to the user equipment.

According to an example implementation, the parameter comprises a first distance between the user equipment and the subject.

According to an example implementation, the pre-warning region is defined by the first distance and a second distance between the user equipment and the subject, wherein the second distance is shorter than the first distance.

According to an example implementation, in the pre-warning region the user equipment is at risk of performing the power backoff.

According to an example implementation, when the distance between the user equipment and the network entity falls below the second distance, the user equipment triggers the power backoff.

According to an example implementation, the deciding and notifying are performed during the established connection.

According to an example implementation, the network entity further comprises:
means for deciding on a permission for the user equipment to enter the monitoring mode, upon receipt of a notification from the user equipment of a detected condition that a distance between the user equipment and the subject enters the pre-warning region; and
means for informing the user equipment about a result of the decision.

According to an example implementation, the network entity further comprises:
means for deciding on a permission for the user equipment to enter the monitoring mode, upon receipt of a corresponding request from the user equipment; and
means for informing the user equipment about a result of the decision.

According to an example implementation, the network entity further comprises:
means for deciding on a monitoring cycle for the monitoring mode, with which at least one of the options of operations are monitored; and
means for informing the user equipment about the monitoring cycle.

According to an example implementation, at least one of the first distance, the permission and the monitoring cycle is decided based on a load of a cell of the network entity.

According to an example implementation, the options of operations to be monitored in the monitoring mode comprise at least one of options selected by the user equipment and options selected by the network entity.

According to an example implementation, the network entity further comprises:
means for updating the user equipment with one of the options of operations monitored in the monitoring mode, which is to be used to mitigate degradation of the established connection due to a required power backoff.

According to an example implementation, the network entity further comprises means for receiving, from the user equipment, information about at least one of the options of operations.

According to an example implementation, the network entity further comprises means for receiving information from the user equipment on whether a monitored link as an option of the monitored options of operations has been monitored using a covered antenna device or an uncovered antenna device of the user equipment.

In the following, further aspects are listed.

1. A method for use by a user equipment, the method comprising:
   detecting a condition that a distance between the user equipment, which has an established connection with a network entity of a communications network system, and a subject enters a pre-warning region; and
   entering a monitoring mode based on at least the detected condition, wherein in the monitoring mode options of operations to be performed by the user equipment to mitigate degradation of the established connection due to a required power backoff of an antenna of the user equipment are monitored.

2. The method of aspect 1, further comprising:
   notifying the network entity of the detected condition.

3. The method of aspect 1 or 2, further comprising:
   requesting permission from the network entity to enter the monitoring mode.

4. The method of any one of aspects 1 to 3, further comprising:
   receiving permission to enter the monitoring mode from the network entity,
   wherein the user equipment enters the monitoring mode based on the detected condition and the permission from the network entity.

5. The method of any one of aspects 1 to 4, wherein the monitoring mode comprises a monitoring cycle with which at least one of the options of operations are monitored.

6. The method of aspect 5, further comprising:
   receiving information on the monitoring cycle from the network entity.

7. The method of any one of aspects 1 to 6, wherein in the pre-warning region the user equipment is at risk of performing the power backoff.

8. The method of any one of aspects 1 to 7, wherein the pre-warning region is defined by a first distance between the user equipment and the subject and a second distance between the user equipment and the subject, wherein the second distance is shorter than the first distance.

9. The method of aspect 7, wherein when the distance between the user equipment and the subject falls below the second distance, the user equipment triggers the power backoff.

10. The method of aspect 8 or 9, further comprising:
    receiving an indication of the first distance from the network entity.

11. The method of any one of aspects 1 to 10, wherein the options of operations to be monitored in the monitoring mode comprise at least one of options selected by the user equipment and options selected by the network entity.

12. The method of any one of aspects 1 to 11, further comprising:
    receiving an update from the network entity with one of the options of operations monitored in the monitoring mode, which is to be used to mitigate degradation of the established connection due to a required power backoff.

13. The method of any one of aspects 1 to 12, wherein
    the user equipment comprises a plurality of antenna devices for covering sectors around the user equipment,
    the antenna of the user equipment is a connected antenna device, which comprises at least one antenna device of the plurality of antenna devices, and operates the established connection with the network entity, and
    the method further comprises:
    measuring, by at least one non-connected antenna device of the plurality of antenna devices, which is different from the connected antenna device and is capable of detecting the subject, a distance between the subject and the at least one non-connected antenna device;
    detecting whether the measured distance is shorter than a first distance, wherein the first distance defines, at least in part, the pre-warning region;
    in case it is detected that the measured distance is shorter than the first distance, detecting, by the at least one non-connected antenna device, a moving direction of the subject; and
    detecting the condition that the distance between the user equipment and the subject has entered the pre-warning region based on the detected moving direction of the subject.

14. The method of aspect 13, further comprising:
    in case the detected moving direction of the subject indicates that the subject is going to enter a sector covered by the connected antenna device and that the subject is going to enter this sector within the first distance, detecting the condition that the distance between the user equipment and the subject has entered the pre-warning region.

15. The method of aspect 13 or 14, wherein the monitoring of options of operations in the monitoring mode comprises:
    determining whether at least one of the plurality of antenna devices is a covered antenna device or an uncovered antenna device.

16. The method of aspect 15, further comprising:
    in case the detected moving direction of the subject indicates that the subject is going to enter a sector covered by the connected antenna device and that the subject is going to enter this sector within the first distance, determining that the at least one antenna device is, at least in part, an uncovered antenna device.

17. The method of aspect 15 or 16, further comprising:
    in case the detected moving direction of the subject indicates that the subject is going to stay in a sector covered by the at least one non-connected antenna device and that the subject is going to stay in this sector within the first distance, determining that the at least one antenna device is, at least in part, a covered antenna device.

18. The method of aspect 14, further comprising:
    detecting, by the at least one non-connected antenna device, a location of the subject at consecutive instants of time;
    calculating the moving direction between the at least one non-connected antenna device and the subject based on the location detected at the consecutive instants of time;
    assessing a location of the subject at an upcoming instant of time based on the calculated moving direction,
    wherein, when it is assessed that at the upcoming instant of time the location of the subject is going to be present in the sector covered by the connected antenna device, detecting that the moving direction is directed to the sector covered by the connected antenna device.

19. The method of aspect 18, wherein the at least one non-connected antenna device comprises a plurality of beams for covering a sector of the at least one non-connected antenna device, the method further comprising:
    detecting the location of the subject based on which beam of the plurality of beams is detecting the subject.

20. The method of aspect 18 or 19, further comprising:
    creating a spherical image of surroundings of the user equipment by using the plurality of antenna devices; and detecting the location of the subject based on the spherical image.

21. The method of aspect 20, wherein
each antenna device of the plurality of antenna devices performs proximity sensing of nearby objects, wherein an image is acquired for each antenna device from the proximity sensing of the antenna device, and
the acquired images are combined into the spherical image.

22. The method of any one of aspects 1 to 21, further comprising:
transmitting information to the network entity, wherein the information is about at least one of the monitored options of operations.

23. The method of aspect 15, further comprising:
informing the network entity on whether a monitored link as an option of the monitored options of operations has been monitored using a covered antenna device or an uncovered antenna device.

24. The method of any one of aspects 13 to 23, further comprising:
periodically estimating channel link parameters with the plurality of antenna devices; and
ranking the plurality of antenna devices based on the estimated channel link parameters.

25. The method of any one of aspects 15, 23 and 24, further comprising:
deciding switching the connection in case measured downlink power at the connected antenna device minus a required amount of the power backoff of the connected antenna device is equal to or lower than a predetermined threshold.

26. A method for use by a network entity of a communications network system, the method comprising:
deciding on a parameter of a pre-warning region, wherein, when a distance between a user equipment and a subject enters the pre-warning region, the user equipment is capable of entering a monitoring mode in which options of operations to be performed by the user equipment to mitigate degradation of an established connection between the user equipment and the network entity due to a required power backoff of an antenna of the user equipment are monitored; and
notifying the parameter to the user equipment.

27. The method of aspect 26,
wherein the parameter comprises a first distance between the user equipment and the subject,
wherein the pre-warning region is defined by the first distance and a second distance between the user equipment and the subject, wherein the second distance is shorter than the first distance,
wherein in the pre-warning region the user equipment is at risk of performing the power backoff, and
wherein, when the distance between the user equipment and the network entity falls below the second distance, the user equipment triggers the power backoff.

28. The method of aspect 26 or 27, wherein the deciding and notifying are performed during the established connection.

29. The method of any one of aspects 26 to 28, further comprising:
deciding on a permission for the user equipment to enter the monitoring mode, upon receipt of a notification from the user equipment of a detected condition that a distance between the user equipment and the subject enters the pre-warning region; and informing the user equipment about a result of the decision.

30. The method of any one of aspects 26 to 29, further comprising:
deciding on a permission for the user equipment to enter the monitoring mode, upon receipt of a corresponding request from the user equipment; and
informing the user equipment about a result of the decision.

31. The method of any one of aspects 26 to 30, further comprising:
deciding on a monitoring cycle for the monitoring mode, with which at least one of the options of operations are monitored; and
informing the user equipment about the monitoring cycle.

32. The method of any one of aspects 26 to 31, wherein at least one of the first distance, the permission and the monitoring cycle is decided based on a load of a cell of the network entity.

33. The method of any one of aspects 26 to 32, wherein the options of operations to be monitored in the monitoring mode comprise at least one of options selected by the user equipment and options selected by the network entity.

34. The method of any one of aspects 26 to 33, further comprising:
updating the user equipment with one of the options of operations monitored in the monitoring mode, which is to be used to mitigate degradation of the established connection due to a required power backoff.

35. The method of any one of aspects 26 to 34, further comprising:
receiving, from the user equipment, information about at least one of the options of operations.

36. The method of aspect 35, further comprising:
receiving information from the user equipment on whether a monitored link as an option of the monitored options of operations has been monitored using a covered antenna device or an uncovered antenna device of the user equipment.

37. A non-transitory computer-readable storage medium storing a program that when executed by a computer causes the computer to perform:
detecting a condition that a distance between a user equipment, which has an established connection with a network entity of a communications network system, and a subject enters a pre-warning region; and
entering a monitoring mode based on at least the detected condition, wherein in the monitoring mode options of operations to be performed by the user equipment to mitigate degradation of the established connection due to a required power backoff of an antenna of the user equipment are monitored.

38. A non-transitory computer-readable storage medium storing a program that when executed by a computer causes the computer to perform:
deciding on a parameter of a pre-warning region, wherein, when a distance between a user equipment and a subject enters the pre-warning region, the user equipment is capable of entering a monitoring mode in which options of operations to be performed by the user equipment to mitigate degradation of an established connection between the user equipment and a network entity of a communications network system due to a required power backoff of an antenna of the user equipment are monitored; and
notifying the parameter to the user equipment.

39. An apparatus for use by a user equipment, the apparatus comprising at least one processor and at least one memory including computer program code, the at least one memory and the computer program code configured to, with the at least one processor, cause the apparatus at least to perform:
  detecting a condition that a distance between the user equipment, which has an established connection with a network entity of a communications network system, and a subject enters a pre-warning region; and
  entering a monitoring mode based on at least the detected condition, wherein in the monitoring mode options of operations to be performed by the user equipment to mitigate degradation of the established connection due to a required power backoff of an antenna of the user equipment are monitored.

40. The apparatus of aspect 39, wherein the at least one memory and the computer program code are configured to, with the at least one processor, cause the apparatus to further perform:
  notifying the network entity of the detected condition.

41. The apparatus of aspect 39 or 40, wherein the at least one memory and the computer program code are configured to, with the at least one processor, cause the apparatus to further perform:
  requesting permission from the network entity to enter the monitoring mode.

42. The apparatus of any one of aspects 39 to 41, wherein the at least one memory and the computer program code are configured to, with the at least one processor, cause the apparatus to further perform:
  receiving permission to enter the monitoring mode from the network entity,
  wherein the user equipment enters the monitoring mode based on the detected condition and the permission from the network entity.

43. The apparatus of any one of aspects 39 to 42, wherein the monitoring mode comprises a monitoring cycle with which at least one of the options of operations are monitored.

44. The apparatus of aspect 43, wherein the at least one memory and the computer program code are configured to, with the at least one processor, cause the apparatus to further perform:
  receiving information on the monitoring cycle from the network entity.

45. The apparatus of any one of aspects 39 to 44, wherein in the pre-warning region the user equipment is at risk of performing the power backoff.

46. The apparatus of any one of aspects 39 to 45, wherein the pre-warning region is defined by a first distance between the user equipment and the subject and a second distance between the user equipment and the subject, wherein the second distance is shorter than the first distance.

47. The apparatus of aspect 45, wherein, when the distance between the user equipment and the network entity falls below the second distance, the at least one memory and the computer program code are configured to, with the at least one processor, cause the apparatus to trigger the power backoff.

48. The apparatus of aspect 46 or 47, wherein the at least one memory and the computer program code are configured to, with the at least one processor, cause the apparatus to further perform:
  receiving an indication of the first distance from the network entity.

49. The apparatus of any one of aspects 39 to 48, wherein the options of operations to be monitored in the monitoring mode comprise at least one of options selected by the user equipment and options selected by the network entity.

50. The apparatus of any one of aspects 39 to 49, wherein the at least one memory and the computer program code are configured to, with the at least one processor, cause the apparatus to further perform:
  receiving an update from the network entity with one of the options of operations monitored in the monitoring mode, which is to be used to mitigate degradation of the established connection due to a required power backoff.

51. The apparatus of any one of aspects 39 to 50, wherein the user equipment comprises a plurality of antenna devices for covering sectors around the user equipment,
  the antenna of the user equipment is a connected antenna device, which comprises at least one antenna device of the plurality of antenna devices, and operates the established connection with the network entity, and
  the at least one memory and the computer program code are configured to, with the at least one processor, cause the apparatus to further perform:
  measuring, by at least one non-connected antenna device of the plurality of antenna devices, which is different from the connected antenna device and is capable of detecting the subject, a distance between the subject and the at least one non-connected antenna device;
  detecting whether the measured distance is shorter than a first distance, wherein the first distance defines, at least in part, the pre-warning region;
  in case it is detected that the measured distance is shorter than the first distance, detecting, by the at least one non-connected antenna device, a moving direction of the subject; and
  detecting the condition that the distance between the user equipment and the subject has entered the pre-warning region based on the detected moving direction of the subject.

52. The apparatus of aspect 51, wherein the at least one memory and the computer program code are configured to, with the at least one processor, cause the apparatus to further perform:
  in case the detected moving direction of the subject indicates that the subject is going to enter a sector covered by the connected antenna device and that the subject is going to enter this sector within the first distance, detecting the condition that the distance between the user equipment and the subject has entered the pre-warning region.

53. The apparatus of aspect 51 or 52, wherein the monitoring of options of operations in the monitoring mode comprises:
  determining whether at least one of the plurality of antenna devices is a covered antenna device or an uncovered antenna device.

54. The apparatus of aspect 53, wherein the at least one memory and the computer program code are configured to, with the at least one processor, cause the apparatus to further perform:
  in case the detected moving direction of the subject indicates that the subject is going to enter a sector covered by the connected antenna device and that the subject is going to enter this sector within the first distance, determining that the at least one antenna device is, at least in part, an uncovered antenna device.

55. The apparatus of aspect 53 or 54, wherein the at least one memory and the computer program code are configured to, with the at least one processor, cause the apparatus to further perform:
  in case the detected moving direction of the subject indicates that the subject is going to stay in a sector covered by the at least one non-connected antenna device and that the subject is going to stay in this sector within the first distance, determining that the at least one antenna device is, at least in part, a covered antenna device.

56. The apparatus of aspect 52, wherein the at least one memory and the computer program code are configured to, with the at least one processor, cause the apparatus to further perform:
  detecting, by the at least one non-connected antenna device, a location of the subject at consecutive instants of time;
  calculating the moving direction between the at least one non-connected antenna device and the subject based on the location detected at the consecutive instants of time;
  assessing a location of the subject at an upcoming instant of time based on the calculated moving direction,
  wherein, when it is assessed that at the upcoming instant of time the location of the subject is going to be present in the sector covered by the connected antenna device, detecting that the moving direction is directed to the sector covered by the connected antenna device.

57. The apparatus of aspect 56, wherein the at least one non-connected antenna device comprises a plurality of beams for covering a sector of the at least one non-connected antenna device, wherein the at least one memory and the computer program code are configured to, with the at least one processor, cause the apparatus to further perform:
  detecting the location of the subject based on which beam of the plurality of beams is detecting the subject.

58. The apparatus of aspect 56 or 57, wherein the at least one memory and the computer program code are configured to, with the at least one processor, cause the apparatus to further perform:
  creating a spherical image of surroundings of the user equipment by using the plurality of antenna devices; and
  detecting the location of the subject based on the spherical image.

59. The apparatus of aspect 58, wherein
  each antenna device of the plurality of antenna devices performs proximity sensing of nearby objects, wherein an image is acquired for each antenna device from the proximity sensing of the antenna device, and
  the acquired images are combined into the spherical image.

60. The apparatus of any one of aspects 39 to 59, wherein the at least one memory and the computer program code are configured to, with the at least one processor, cause the apparatus to further perform:
  transmitting information to the network entity, wherein the information is about at least one of the monitored options of operations.

61. The apparatus of aspect 53, wherein the at least one memory and the computer program code are configured to, with the at least one processor, cause the apparatus to further perform:
  informing the network entity on whether a monitored link as an option of the monitored options of operations has been monitored using a covered antenna device or an uncovered antenna device.

62. The apparatus of any one of aspects 51 to 61, wherein the at least one memory and the computer program code are configured to, with the at least one processor, cause the apparatus to further perform:
  periodically estimating channel link parameters with the plurality of antenna devices; and
  ranking the plurality of antenna devices based on the estimated channel link parameters.

63. The apparatus of any one of aspects 41, 61 and 62, wherein the at least one memory and the computer program code are configured to, with the at least one processor, cause the apparatus to further perform:
  deciding switching the connection in case measured downlink power at the connected antenna device minus a required amount of the power backoff of the connected antenna device is equal to or lower than a predetermined threshold.

64. An apparatus for use by a network entity of a communications network system, the apparatus comprising at least one processor and at least one memory including computer program code, the at least one memory and the computer program code configured to, with the at least one processor, cause the apparatus at least to perform:
  deciding on a parameter of a pre-warning region, wherein, when a distance between a user equipment and a subject enters the pre-warning region, the user equipment is capable of entering a monitoring mode in which options of operations to be performed by the user equipment to mitigate degradation of an established connection between the user equipment and the network entity due to a required power backoff of an antenna of the user equipment are monitored; and
  notifying the parameter to the user equipment.

65. The apparatus of aspect 64,
  wherein the parameter comprises a first distance between the user equipment and the subject,
  wherein the pre-warning region is defined by the first distance and a second distance between the user equipment and the subject, wherein the second distance is shorter than the first distance,
  wherein in the pre-warning region the user equipment is at risk of performing the power backoff, and
  wherein, when the distance between the user equipment and the network entity falls below the second distance, the user equipment triggers the power backoff.

66. The apparatus of aspect 64 or 65, wherein the deciding and notifying are performed during the established connection.

67. The apparatus of any one of aspects 64 to 66, wherein the at least one memory and the computer program code are configured to, with the at least one processor, cause the apparatus to further perform:
  deciding on a permission for the user equipment to enter the monitoring mode, upon receipt of a notification from the user equipment of a detected condition that a distance between the user equipment and the subject enters the pre-warning region; and
  informing the user equipment about a result of the decision.

68. The apparatus of any one of aspects 64 to 67, wherein the at least one memory and the computer program code are configured to, with the at least one processor, cause the apparatus to further perform:
  deciding on a permission for the user equipment to enter the monitoring mode, upon receipt of a corresponding request from the user equipment; and informing the user equipment about a result of the decision.

69. The apparatus of any one of aspects 64 to 68, wherein the at least one memory and the computer program code are configured to, with the at least one processor, cause the apparatus to further perform:
deciding on a monitoring cycle for the monitoring mode, with which at least one of the options of operations are monitored; and
informing the user equipment about the monitoring cycle.

70. The apparatus of any one of aspects 64 to 69, wherein at least one of the first distance, the permission and the monitoring cycle is decided based on a load of a cell of the network entity.

71. The apparatus of any one of aspects 64 to 70, wherein the options of operations to be monitored in the monitoring mode comprise at least one of options selected by the user equipment and options selected by the network entity.

72. The apparatus of any one of aspects 64 to 71, wherein the at least one memory and the computer program code are configured to, with the at least one processor, cause the apparatus to further perform:
updating the user equipment with one of the options of operations monitored in the monitoring mode, which is to be used to mitigate degradation of the established connection due to a required power backoff.

73. The apparatus of any one of aspects 64 to 72, wherein the at least one memory and the computer program code are configured to, with the at least one processor, cause the apparatus to further perform:
receiving, from the user equipment, information about at least one of the options of operations.

74. The apparatus of aspect 73, wherein the at least one memory and the computer program code are configured to, with the at least one processor, cause the apparatus to further perform:
receiving information from the user equipment on whether a monitored link as an option of the monitored options of operations has been monitored using a covered antenna device or an uncovered antenna device of the user equipment.

It is to be understood that the above description is illustrative and is not to be construed as limiting. Various modifications and applications may occur to those skilled in the art without departing from the true spirit and scope as defined by the appended claims.

The invention claimed is:

1. A method for use by a user equipment, the user equipment comprising a plurality of antenna devices for covering sectors around the user equipment, the plurality of antenna devices of the user equipment comprising a connected antenna device that operates an established connection with a network entity of a communications network system, the method comprising:
measuring, by at least one non-connected antenna device of the plurality of antenna devices, which is different from the connected antenna device and is capable of detecting a subject, a distance between the subject and the at least one non-connected antenna device;
detecting, based on the measuring, that the distance between the user equipment and the subject enters a pre-warning region, wherein the pre-warning region is based on at least a first distance;
entering a monitoring mode based on the distance between the user equipment and the subject being less than the first distance, wherein in the monitoring mode the user equipment performs an operation to mitigate degradation of the established connection due to a required power backoff of an antenna of the user equipment;
detecting, by the at least one non-connected antenna device, a moving direction of the subject; and
detecting a condition that the distance between the user equipment and the subject has entered the pre-warning region based on the detected moving direction of the subject.

2. An apparatus for use by a user equipment, the user equipment comprising a plurality of antenna devices for covering sectors around the user equipment, the plurality of antenna devices of the user equipment comprising a connected antenna device that operates an established connection with a network entity of a communications network system, the apparatus comprising:
at least one processor; and
at least one memory including computer program code;
the at least one memory and the computer program code configured to, with the at least one processor, cause the apparatus at least to:
measure, by at least one non-connected antenna device of the plurality of antenna devices, which is different from the connected antenna device and is capable of detecting a subject, a distance between the subject and the at least one non-connected antenna device;
detect, based on the measuring, that the distance between the user equipment and the subject enters a pre-warning region, wherein the pre-warning region is based on at least a first distance;
enter a monitoring mode based on the distance between the user equipment and the subject being less than the first distance, wherein in the monitoring mode the user equipment performs an operation to mitigate degradation of the established connection due to a required power backoff of an antenna of the user equipment;
detect, by the at least one non-connected antenna device, a moving direction of the subject; and
detect a condition that the distance between the user equipment and the subject has entered the pre-warning region based on the detected moving direction of the subject.

3. The apparatus of claim 2, wherein the at least one processor and the computer program code configured to cause the apparatus to detect comprises the at least one processor and the computer program code configured to cause the apparatus to:
detect the condition that the distance between the user equipment and the subject has entered the pre-warning region, based on the measured distance between the subject and the user equipment being less than a second distance, wherein the second distance defines at least in part the pre-warning region.

4. The apparatus of claim 3, wherein the at least one processor and the computer program code are configured to further cause the apparatus to:
in case the detected moving direction of the subject indicates that the subject is going to enter a sector covered by the connected antenna device and that the subject is going to enter this sector within the first distance, detect the condition that the distance between the user equipment and the subject has entered the pre-warning region.

5. The apparatus of claim 4, wherein the at least one processor and the computer program code are configured to further cause the apparatus to:

detect, by the at least one non-connected antenna device, a location of the subject at consecutive instants of time;

calculate the moving direction between the at least one non-connected antenna device and the subject based on the location detected at the consecutive instants of time;

assess a location of the subject at an upcoming instant of time based on the calculated moving direction; and when it is assessed that at the upcoming instant of time the location of the subject is going to be present in the sector covered by the connected antenna device, detect that the moving direction is directed to the sector covered by the connected antenna device.

6. The apparatus of claim 5, wherein the at least one non-connected antenna device comprises a plurality of beams for covering a sector of the at least one non-connected antenna device, wherein the at least one processor and the computer program code are configured to further cause the apparatus to:

detect the location of the subject based on which beam of the plurality of beams is detecting the subject.

7. The apparatus of claim 5, wherein the at least one processor and the computer program code are configured to further cause the apparatus to:

create a spherical image of surroundings of the user equipment by using the plurality of antenna devices; and detect the location of the subject based on the spherical image.

8. The apparatus of claim 7:

wherein each antenna device of the plurality of antenna devices performs proximity sensing of nearby objects; and wherein the at least one processor and the computer program code are configured to further cause the apparatus to:

acquire an image for each antenna device from the proximity sensing of the antenna device; and combine the acquired images into the spherical image.

9. The apparatus of claim 3, wherein for the monitoring of options of operations in the monitoring mode the at least one processor and the computer program code are configured to further cause the apparatus to:

determine whether at least one of the plurality of antenna devices is a covered antenna device or an uncovered antenna device.

10. The apparatus of claim 9, wherein the at least one processor and the computer program code are configured to further cause the apparatus to:

in case the detected moving direction of the subject indicates that the subject is going to enter a sector covered by the connected antenna device and that the subject is going to enter this sector within the first distance, determine that the at least one antenna device is, at least in part, an uncovered antenna device.

11. The apparatus of claim 9, wherein the at least one processor and the computer program code are configured to further cause the apparatus to:

in case the detected moving direction of the subject indicates that the subject is going to stay in a sector covered by the at least one non-connected antenna device and that the subject is going to stay in this sector within the first distance, determine that the at least one antenna device is, at least in part, a covered antenna device.

12. The apparatus of claim 9, wherein the at least one processor and the computer program code are configured to further cause the apparatus to:

inform the network entity on whether a monitored link as an option of the monitored options of operations has been monitored using a covered antenna device or an uncovered antenna device.

13. The apparatus of claim 3, wherein the at least one processor and the computer program code are configured to further cause the apparatus to:

transmit information to the network entity, wherein the information is associated with the monitoring mode.

14. The apparatus of claim 3, wherein the at least one processor and the computer program code are configured to further cause the apparatus to:

periodically estimate channel link parameters with the plurality of antenna devices; and rank the plurality of antenna devices based on the estimated channel link parameters.

15. The apparatus of claim 3, wherein the at least one processor and the computer program code are configured to further cause the apparatus to:

decide switching the connection in case measured downlink power at the connected antenna device minus a required amount of the power backoff of the connected antenna device is equal to or lower than a predetermined threshold.

* * * * *